United States Patent
Haraguchi et al.

(10) Patent No.: US 10,301,502 B2
(45) Date of Patent: May 28, 2019

(54) CURABLE COMPOSITION FOR COATING CONTAINING FLUORINE-CONTAINING HIGHLY BRANCHED POLYMER

(75) Inventors: Masayuki Haraguchi, Funabashi (JP); Motonobu Matsuyama, Funabashi (JP); Tomoko Misaki, Funabashi (JP); Masaaki Ozawa, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 1078 days.

(21) Appl. No.: 13/990,216

(22) PCT Filed: Dec. 1, 2011

(86) PCT No.: PCT/JP2011/077850
§ 371 (c)(1),
(2), (4) Date: Jul. 31, 2013

(87) PCT Pub. No.: WO2012/074071
PCT Pub. Date: Jun. 7, 2012

(65) Prior Publication Data
US 2013/0302598 A1 Nov. 14, 2013

(30) Foreign Application Priority Data

Dec. 1, 2010 (JP) ................................ 2010-268875
Apr. 15, 2011 (JP) ................................ 2011-091392

(51) Int. Cl.
*C09D 133/14* (2006.01)
*C09D 4/06* (2006.01)
*C09D 183/04* (2006.01)
*C08G 77/24* (2006.01)
*C08G 77/20* (2006.01)

(52) U.S. Cl.
CPC ............. *C09D 133/14* (2013.01); *C09D 4/06* (2013.01); *C09D 183/04* (2013.01); *C08G 77/20* (2013.01); *C08G 77/24* (2013.01); *Y10T 428/265* (2015.01)

(58) Field of Classification Search
CPC ...... C09D 4/06; C09D 133/14; C09D 183/04; C09D 127/12; C08G 77/24
USPC ...................................... 428/336, 421, 411.1
See application file for complete search history.

(56) References Cited

U.S. PATENT DOCUMENTS

| | | | |
|---|---|---|---|
| 5,047,556 A * | 9/1991 | Kohler | C07D 335/16 549/27 |
| 2003/0134950 A1 * | 7/2003 | Kudo | C08K 9/06 524/262 |
| 2007/0032615 A1 * | 2/2007 | Sato | C08F 2/06 526/82 |
| 2007/0092644 A1 * | 4/2007 | Soutar | B41J 2/1606 427/240 |
| 2007/0286993 A1 * | 12/2007 | Radcliffe | G02B 1/111 428/212 |
| 2009/0181242 A1 * | 7/2009 | Enniss | B32B 17/10018 428/332 |
| 2009/0301027 A1 * | 12/2009 | Pelletier | C04B 41/009 52/741.4 |
| 2012/0135206 A1 * | 5/2012 | Haraguchi | C08F 2/48 428/195.1 |
| 2015/0284556 A1 * | 10/2015 | Sugiyama | G02B 1/041 428/412 |

FOREIGN PATENT DOCUMENTS

| | | |
|---|---|---|
| JP | 2005-120288 | 5/2005 |
| JP | 2005-179613 | 7/2005 |
| JP | 2007-264277 | 10/2007 |
| JP | 2010-24330 | 2/2010 |
| JP | 2010-189525 | 9/2010 |
| JP | A-2010-275491 | 12/2010 |
| WO | WO 2007/049608 A1 | 5/2007 |
| WO | WO 2010/126140 A1 | 11/2010 |
| WO | WO 2010/137724 A1 | 12/2010 |
| WO | WO 2011/102383 A1 | 8/2011 |

OTHER PUBLICATIONS

Lee et al., Cure depth in Photopolymerization: Experiments and theory, J. Mater. Res., Dec. 2001, vol. 16, No. 12, pp. 3536-3544.*
Feb. 28, 2012 International Search Report issued in International Patent Application No. PCT/JP2011/077850.

* cited by examiner

*Primary Examiner* — Callie E Shosho
*Assistant Examiner* — Patrick N English
(74) *Attorney, Agent, or Firm* — Oliff PLC

(57) ABSTRACT

A curable composition for coating comprising: (a) a fluorine-containing highly branched polymer obtained by polymerization of a monomer A having two or more radical polymerizable double bonds in a molecule of the monomer A and a monomer B having a fluoroalkyl group and at least one radical polymerizable double bond in a molecule of the monomer B, in the presence of a polymerization initiator C at an amount of 5% by mole to 200% by mole per the number of moles of the monomer A, (b) at least one surface modifier selected from the group consisting of a perfluoropolyether compound and a silicone compound, (c) an active energy ray-curable polyfunctional monomer, and (d) a polymerization initiator that generates radicals by irradiation with an active energy ray; a cured film obtained from the composition; and a hard coating film obtained by use of the composition.

25 Claims, 3 Drawing Sheets

CURABLE COMPOSITION FOR COATING CONTAINING FLUORINE-CONTAINING HIGHLY BRANCHED POLYMER

TECHNICAL FIELD

The present invention relates to a curable composition for coating containing a fluorine-containing highly branched polymer and a hard coating film obtained from the curable composition.

BACKGROUND ART

In recent years, polymer (macromolecule) materials have been used more and more in various fields. Accompanying with this, not only properties of a polymer as a matrix but also characteristics of the surface and interface of the polymer become important, depending on each field. For example, by using a fluorine compound having low surface energy as a surface modifier, characteristics relevant to surface/interface control such as a water/oil repellent property, an antifouling property, a non-adhesive property, a delamination property, a mold releasing property, a sliding property, abrasion resistance, an antireflective property, and chemical resistance are expected to be enhanced and are developed variously.

On the surfaces of various displays such as liquid crystal displays (LCDs), plasma display panels (PDPs), and touch panels, various plastic films having a hard coating layer for preventing scratches are used. Fingerprint marks and dirt are, however, easy to be attached to the hard coating layer, and the attached fingerprint marks and dirt are difficult to be removed. For this reason, the visibility of the images of the display is drastically impaired and the display is defiled. Particularly, a user directly touches the surface of a touch panel, and thus, a touch panel to which fingerprint marks are difficult to be attached and, if attached, from which the fingerprint marks are easily removed has been eagerly desired.

In order to form such a hard coating layer, specifically, a coating agent for a hard coating layer or a coating agent for an antireflective layer that includes a silicone compound, and a fluorine-containing oligomer or polymer is disclosed as a coating agent for forming a hard coating layer (Patent Document 1). It is disclosed that a hard coating layer obtained from a coating agent for a hard coating layer including a perfluoropolyether and a fluorine-containing block polymer has wiping resistance with acetone (Patent Document 2).

A method including adding a branched polymer to a matrix polymer made of a linear polymer and segregating the branched polymer on the surface of the matrix polymer is known as one of the methods for surface modification of polymers (Patent Document 3).

PRIOR ART DOCUMENTS

Patent Documents

Patent Document 1: Japanese Patent Application Publication No. 2007-264277 (JP 2007-264277 A)
Patent Document 2: Japanese Patent Application Publication No. 2005-179613 (JP 2005-179613 A)
Patent Document 3: WO 2007/049608 Pamphlet

SUMMARY OF THE INVENTION

Problem to be Solved by the Invention

As described above, various methods for modifying the surface of a hard coating layer by adding a silicon compound (a silicone-based surface conditioner) or a fluorine compound (a fluorine-based surface conditioner) to a coating agent for forming a hard coating layer are developed. In various displays and electronic device housings having a hard coating layer including a silicon compound and a fluorine compound, deterioration of surface characteristics such as an anti-fingerprint property has become an issue that is caused by wiping off the dirt attached to the surfaces of the displays and electronic device housings using a piece of tissue paper or a piece of wet tissue impregnated with an organic solvent as represented by ethanol by users who use the displays and electronic device housings.

In the method of Patent Document 2 described above, for example, the hard coating film having acetone wiping resistance is obtained. As conditions for curing the coating agent, however, the hard coating film is formed by curing with electron beam irradiation under nitrogen atmosphere. There has been an issue that the acetone wiping resistance (durability) cannot be obtained in curing conditions of ultraviolet ray irradiation under nitrogen atmosphere or air atmosphere that are generally used.

As described above, conventional hard coating films do not satisfy organic solvent resistance of surface characteristics such as the anti-fingerprint property, and further improvement has been desired.

In other words, a composition for forming a hard coating layer that has excellent surface characteristics such as the anti-fingerprint property and excellent solvent wiping resistance, that is, durability in antifouling properties and that can be cured by ultraviolet ray irradiation under nitrogen atmosphere or air atmosphere that is generally used has been desired.

Means for Solving the Problem

As a result of an intensive investigation for solving the problems, the inventors of the present invention have found out that a hard coating layer having antifouling properties such as the anti-fingerprint property and durability in the solvent wiping resistance can be formed from a curable composition containing a highly branched polymer in which fluoroalkyl groups are introduced at the terminals, a fluorine-based or silicone-based surface modifier, a polyfunctional monomer, and a polymerization initiator, and, in addition, that the hard coating layer can exert these characteristics in conventionally used curing conditions with ultraviolet irradiation, and thus, the inventors of the present invention have accomplished the present invention.

Specifically, as a first aspect, the present invention relates to a curable composition for coating including: (a) a fluorine-containing highly branched polymer obtained by polymerization of a monomer A having two or more radical polymerizable double bonds in its molecule and a monomer B having a fluoroalkyl group and at least one radical polymerizable double bond in its molecule, in the presence of a polymerization initiator C at an amount of 5% by mole to 200% by mole per the number of moles of the monomer A; (b) at least one surface modifier selected from the group consisting of a perfluoropolyether compound and a silicone compound; (c) an active energy ray-curable polyfunctional monomer; and (d) a polymerization initiator that generates radicals by irradiation with an active energy ray.

As a second aspect, the present invention relates to the curable composition for coating according to the first aspect, in which 0.001% by mass to 20% by mass of (a) the fluorine-containing highly branched polymer per mass of (c) the polyfunctional monomer.

As a third aspect, the present invention relates to the curable composition for coating according to the second aspect, in which the monomer A is a compound having any one of or both of a vinyl group or a (meth)acrylic group.

As a fourth aspect, the present invention relates to the curable composition for coating according to the third aspect, in which the monomer A is a divinyl compound or a di(meth)acrylate compound.

As a fifth aspect, the present invention relates to the curable composition for coating according to the fourth aspect, in which the monomer A is ethylene glycol di(meth)acrylate.

As a sixth aspect, the present invention relates to the curable composition for coating according to the second aspect, in which (a) the fluorine-containing highly branched polymer is a highly branched polymer obtained by using 5% by mole to 300% by mole of the monomer B per the monomer A.

As a seventh aspect, the present invention relates to the curable composition for coating according to the sixth aspect, in which the monomer B is a compound having any one of or both of a vinyl group or a (meth)acrylic group.

As an eighth aspect, the present invention relates to the curable composition for coating according to the seventh aspect, in which the monomer B is a compound of Formula [1].

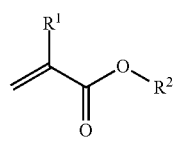

[1]

(where $R^1$ is a hydrogen atom or a methyl group; and $R^2$ is a fluoroalkyl group having a carbon atom number of 2 to 12 and optionally substituted with a hydroxy group).

As a ninth aspect, the present invention relates to the curable composition for coating according to the eighth aspect, in which the monomer B is a compound of Formula [2].

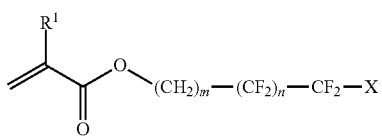

[2]

(where $R^1$ has the same definition as in Formula [1]; X is a hydrogen atom or a fluorine atom; m is 1 or 2; and n is an integer of 0 to 5).

As a tenth aspect, the present invention relates to the curable composition for coating according to the second aspect, in which the polymerization initiator C is an azo-based polymerization initiator.

As an eleventh aspect, the present invention relates to the curable composition for coating according to the tenth aspect, in which the polymerization initiator C is dimethyl 2,2'-azobisisobutyrate.

As a twelfth aspect, the present invention relates to the curable composition for coating according to any one of the first aspect to the eleventh aspect, in which the curable composition includes 0.001% by mass to 20% by mass of (b) the surface modifier per mass of (c) the polyfunctional monomer.

As a thirteenth aspect, the present invention relates to the curable composition for coating according to the twelfth aspect, in which (b) the surface modifier is a compound having a (meth)acryloyl group.

As a fourteenth aspect, the present invention relates to the curable composition for coating according to the twelfth aspect or the thirteenth aspect, in which (b) the surface modifier is a perfluoropolyether compound.

As a fifteenth aspect, the present invention relates to the curable composition for coating according to any one of the first aspect to the eleventh aspect, in which (c) the polyfunctional monomer is at least one selected from the group consisting of a polyfunctional (meth)acrylate compound and a polyfunctional urethane (meth)acrylate compound.

As a sixteenth aspect, the present invention relates to the curable composition for coating according to any one of the first aspect to the eleventh aspect, in which the curable composition includes 1% by mass to 20% by mass of (d) the polymerization initiator per mass of (c) the polyfunctional monomer.

As a seventeenth aspect, the present invention relates to the curable composition for coating according to the sixteenth aspect, in which (d) the polymerization initiator is an alkylphenone compound.

As an eighteenth aspect, the present invention relates to the curable composition for coating according to any one of the first aspect to the eleventh aspect, further including (e) silica fine particles.

As a nineteenth aspect, the present invention relates to the curable composition for coating according to the eighteenth aspect, in which the curable composition includes 5% by mass to 80% by mass of (e) the silica fine particles per mass of (c) the polyfunctional monomer.

As a twentieth aspect, the present invention relates to the curable composition for coating according to the nineteenth aspect, in which (e) the silica fine particles have an average particle diameter of 1 nm to 100 nm.

As a twenty-first aspect, the present invention relates to the curable composition for coating according to any one of the first aspect to the twentieth aspect, further including a solvent.

As a twenty-second aspect, the present invention relates to a cured film made from the curable composition for coating as described in any one of the first aspect to the twenty-first aspect.

As a twenty-third aspect, the present invention relates to a hard coating film including a hard coating layer on at least one surface of a film substrate, the hard coating layer being formed by forming a coating film by applying the curable composition for coating as described in the twenty-first aspect on the film substrate; drying the coating film to remove the solvent; and irradiating the coating film with ultraviolet rays to cure the coating film.

As a twenty-fourth aspect, the present invention relates to the hard coating film according to the twenty-third aspect, in which the hard coating layer has a film thickness of 1 μm to 30 μm.

Effects of the Invention

The curable composition for coating of the present invention includes a specific fluorine-containing highly branched polymer as one component. The highly branched polymer purposefully introduces a branched structure, and thus, the highly branched polymer has less entanglement of molecules compared with a linear macromolecule, exhibits particle-like behavior, and has high solubility in organic solvents and high dispersibility in resins. For this reason, when a hard coating layer is formed using the curable composition for coating of the present invention, the particulate highly branched polymer easily moves to an interface (the surface of the hard coating layer) and is easy to provide activity including antifouling properties such as the anti-fingerprint property to the resin surface.

The curable composition for coating of the present invention includes at least one surface modifier selected from the group consisting of a perfluoropolyether compound and a silicone compound. This provides a felt pen ink wiping off property and durability in antifouling properties such as the anti-fingerprint property, as seen in solvent wiping resistance described above, to the cured film obtained from the composition.

The curable composition for coating of the present invention does not need specific curing conditions such as electron beam irradiation under nitrogen atmosphere by selecting, as the polymerization initiator, a polymerization initiator that generates radicals by irradiation with active energy rays, in particular, a specific polymerization initiator. Even in usual curing conditions, that is, in ultraviolet ray irradiation under nitrogen atmosphere or air atmosphere, the curable composition can form the cured film having surface activities described above.

MODES FOR CARRYING OUT THE INVENTION

<Curable Composition for Coating>

Figure 1:
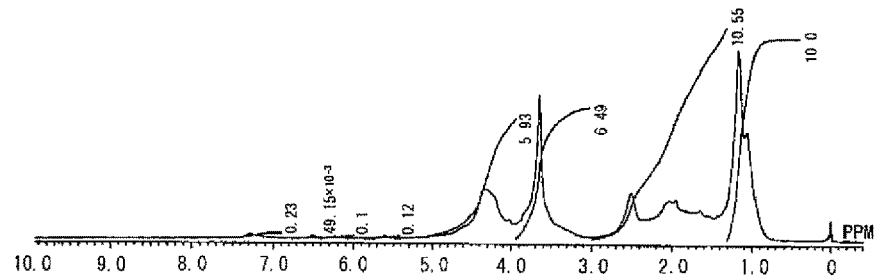
FIG. 1 is a chart illustrating $^1$H NMR spectrum of a highly branched polymer 1 produced in Synthesis Example 1.

The curable composition for coating of the present invention is constituted by including (a) a fluorine-containing highly branched polymer, (b) at least one surface modifier selected from the group consisting of a perfluoropolyether compound and a silicone compound; (c) an active energy ray-curable polyfunctional monomer; and (d) a polymerization initiator that generates radicals by irradiation with an active energy ray.

Hereinafter, each of the components (a) to (d) will be described.

[(a) Fluorine-Containing Highly Branched Polymer]

The fluorine-containing highly branched polymer (a) is a polymer obtained by polymerization of a monomer A having two or more radical polymerizable double bonds in its molecule and a monomer B having a fluoroalkyl group and at least one radical polymerizable double bond in its molecule, in the presence of a polymerization initiator C at an amount of 5% by mole to 200% by mole per the number of moles of the monomer A. The fluorine-containing highly branched polymer (a) is what is called an initiator fragment incorporated fluorine-containing highly branched polymer and contains fragments of the polymerization initiator C used in the polymerization at terminals thereof.

[Monomer A]

In the present invention, the monomer A having two or more radical polymerizable double bonds in the molecule preferably has any one of or both of vinyl groups or (meth)acrylic groups and is particularly preferably a divinyl compound or a di(meth)acrylate compound. In the present invention, the (meth)acrylate compound means both an acrylate compound and a methacrylate compound. For example, (meth)acrylic acid means acrylic acid and methacrylic acid.

Examples of the monomer A as described above include organic compounds indicated in the following (A1) to (A7).

(A1) Vinyl Hydrocarbons:

(A1-1) Aliphatic vinyl hydrocarbons; isoprene, butadiene, 3-methyl-1,2-butadiene, 2,3-dimethyl-1,3-butadiene, 1,2-polybutadiene, pentadiene, hexadiene, octadiene, and the like (A1-2) Alicyclic vinyl hydrocarbons; cyclopentadiene, cyclohexadiene, cyclooctadiene, norbornadiene, and the like (A1-3) Aromatic vinyl hydrocarbons; divinylbenzene, divinyltoluene, divinylxylene, trivinylbenzene, divinylbiphenyl, divinylnaphthalene, divinylfluorene, divinylcarbazole, divinylpyridine, and the like (A2) Vinyl Esters, Allyl Esters, Vinyl Ethers, Allyl Ethers, and Vinyl Ketones:

(A2-1) Vinyl esters; divinyl adipate, divinyl maleate, divinyl phthalate, divinyl isophthalate, divinyl itaconate, vinyl (meth)acrylate, and the like (A2-2) Allyl esters; diallyl maleate, diallyl phthalate, diallyl isophthalate, diallyl adipate, allyl (meth)acrylate, and the like (A2-3) Vinyl ethers; divinyl ether, diethylene glycol divinyl ether, triethylene glycol divinyl ether, and the like (A2-4) Allyl ethers; diallylether, diallyloxyethane, triallyloxyethane, tetraallyloxyethane, tetraallyloxypropane, tetraallyloxybutane, tetramethallyloxyethane, and the like (A2-5) Vinyl ketones; divinylketone, diallylketone, and the like (A3) (Meth)Acrylic Esters:

ethylene glycol di(meth)acrylate, triethylene glycol di(meth)acrylate, propylene glycol di(meth)acrylate, neopentyl glycol di(meth)acrylate, trimethylolpropane tri(meth)acrylate, ditrimethylolpropane tetra(meth)acrylate, glycerol tri(meth)acrylate, pentaerythritol tetra(meth)acrylate, an alkoxy titanium tri(meth)acrylate, 1,6-hexanediol di(meth)acrylate, 2-methyl-1,8-octanediol di(meth)acrylate, 1,9-nonanediol di(meth)acrylate, 1,10-decanediol di(meth)acrylate, tricyclo[5.2.1.0$^{2,6}$]decanedimethanol di(meth)acrylate, dioxane glycol di(meth)acrylate, 2-hydroxy-1-acryloyloxy-3-methacryloyloxypropane, 2-hydroxy-1,3-di(meth)acryloyloxypropane, 9,9-bis[4-(2-(meth)acryloyloxyethoxy)phenyl]fluorene, undecylenoxyethylene glycol di(meth)acrylate, bis[4-(meth)acryloylthiophenyl]sulfide, bis[2-(meth)acryloylthioethyl]sulfide, 1,3-adamantanediol di(meth)acrylate, 1,3-adamantanedimethanol di(meth)acrylate, an aromatic urethane di(meth)acrylate, an aliphatic urethane di(meth)acrylate, and the like (A4) Vinyl Compounds Having Polyalkylene Glycol Chains:

polyethylene glycol (molecular weight 300) di(meth)acrylate, polypropylene glycol (molecular weight 500) di(meth)acrylate, and the like (A5) Nitrogen-containing vinyl compounds:

diallylamine, diallylisocyanurate, diallylcyanurate, methylenebis(meth)acrylamide, bismaleimide, and the like (A6) Silicon-Containing Vinyl Compounds:
dimethyldivinylsilane, divinylmethylphenylsilane, diphenyldivinylsilane, 1,3-divinyl-1,1,3,3-tetramethyldisilazane, 1,3-divinyl-1,1,3,3-tetraphenyldisilazane, diethoxydivinylsilane, and the like (A7) Fluorine-Containing Vinyl Compounds:
1,4-divinylperfluorobutane, 1,4-divinyloctafluorobutane, 1,6-divinylperfluorohexane, 1,6-divinyldodecafluorohexane, 1,8-divinylperfluorooctane, 1,8-divinylhexadecafluorooctane, and the like.

Among these compounds, preferable compounds are the aromatic vinyl hydrocarbons of (A1-3) group, the vinyl esters, allyl esters, vinyl ethers, allyl ethers, and vinyl ketones of (A2) group, the (meth)acrylic esters of (A3) group, the vinyl compounds having polyalkylene glycol chains of (A4) group, and the nitrogen-containing vinyl compounds of (A5) group. Particularly preferable compounds are divinylbenzene belonging to (A1-3) group, diallyl phthalate belonging to (A2) group, ethylene glycol di(meth)acrylate, 1,3-adamantanedimethanol di(meth)acrylate, tricyclo[5.2.1.0$^{2,6}$]decanedimethanol di(meth)acrylate, and the aliphatic urethane di(meth)acrylate that are belonging to (A3) group, and methylenebis(meth)acrylamide belonging to (A5) group. Among them, ethylene glycol di(meth)acrylate is particularly preferable.

[Monomer B]

In the present invention, the monomer B having a fluoroalkyl group and at least one radical polymerizable double bond in the molecule preferably has any one of or both of a vinyl group or a (meth)acrylic group. Particularly, the compound of Formula [1] is preferable, and the compound of Formula [2] is more preferable.

Examples of this monomer B include 2,2,2-trifluoroethyl (meth)acrylate, 2,2,3,3,3-pentafluoropropyl (meth)acrylate, 2-(perfluorobutyl)ethyl (meth)acrylate, 2-(perfluorohexyl)ethyl (meth)acrylate, 2-(perfluorooctyl)ethyl (meth)acrylate, 2-(perfluorodecyl)ethyl (meth)acrylate, 2-(perfluoro-3-methylbutyl)ethyl (meth)acrylate, 2-(perfluoro-5-methylhexyl)ethyl (meth)acrylate, 2-(perfluoro-7-methyloctyl)ethyl (meth)acrylate, 1H,1H,3H-tetrafluoropropyl (meth)acrylate, 1H,1H,5H-octafluoropentyl (meth)acrylate, 1H,1H,7H-dodecafluoroheptyl (meth)acrylate, 1H,1H,9H-hexadecafluorononyl (meth)acrylate, 1H-1-(trifluoromethyl)trifluoroethyl (meth)acrylate, 1H,1H,3H-hexafluorobutyl (meth)acrylate, 3-perfluorobutyl-2-hydroxypropyl (meth)acrylate, 3-perfluorohexyl-2-hydroxypropyl (meth)acrylate, 3-perfluorooctyl-2-hydroxypropyl (meth)acrylate, 3-(perfluoro-3-methylbutyl)-2-hydroxypropyl (meth)acrylate, 3-(perfluoro-5-methylhexyl)-2-hydroxypropyl (meth)acrylate, and 3-(perfluoro-7-methyloctyl)-2-hydroxypropyl (meth)acrylate.

In the present invention, the monomer B is preferably used in an amount of 5% by mole to 300% by mole, particularly an amount of 10% by mole to 150% by mole, and more preferably an amount of 20% by mole to 100% by mole per the number of moles used of the monomer A from the viewpoint of reactivity and surface modification effect.

[Other Monomers]

In the present invention, in addition to the monomer A and the monomer B, other monomers having at least one radical polymerizable double bond in its molecule may be included.

Such other monomers preferably have any one of or both of a vinyl group or a (meth)acrylic group. In addition to this, from the viewpoint of dispersibility to the perfluoropolyether compounds being the surface modifier (b), for example, 2-(2-vinyloxyethoxy)ethyl (meth)acrylate, 2-methoxyethyl (meth)acrylate, 3-methoxypropyl (meth)acrylate, methoxyethylene glycol mono(meth)acrylate, methoxypolyethylene glycol mono(meth)acrylate, methoxypropylene glycol mono(meth)acrylate, and methoxypolypropylene glycol mono(meth)acrylate are preferable.

From the viewpoint of dispersibility to the silicone compound being the surface modifier (b), for example, 3-tris(triethoxysiloxy)silylpropyl (meth)acrylate, 3-trimethoxysilylpropyl (meth)acrylate, and 3-triethoxysilylpropyl (meth)acrylate are preferable.

Among them, 2-(2-vinyloxyethoxy)ethyl (meth)acrylate and 3-tris(triethoxysiloxy)silylpropyl (meth)acrylate is particularly preferable.

In the present invention, the other monomer is preferably used in an amount of 5% by mole to 300% by mole, particularly an amount of 10% by mole to 150% by mole, and more preferably an amount of 20% by mole to 100% by mole per the number of moles used of the monomer A.

[Polymerization Initiator C]

As the polymerization initiator C in the present invention, an azo-based polymerization initiator is preferably used. Examples of the azo-based polymerization initiator may include the following compounds indicated by (1) to (6).

(1) Azonitrile Compounds:
2,2'-azobisisobutyronitrile, 2,2'-azobis(2-methylbutyronitrile), 2,2'-azobis(2,4-dimethylvaleronitrile), 1,1'-azobis(1-cyclohexanecarbonitrile), 2,2-azobis(4-methoxy-2,4-dimethylvaleronitrile), 2-(carbamoylazo)isobutyronitrile, and the like.

(2) Azoamide Compounds:
2,2'-azobis{2-methyl-N-[1,1-bis(hydroxymethyl)-2-hydroxyethyl]propionamide}, 2,2'-azobis{2-methyl-N-[2-(1-hydroxybutyl)]propionamide}, 2,2'-azobis[2-methyl-N-(2-hydroxyethyl)propionamide], 2,2'-azobis[N-(2-propenyl)-2-methylpropionamide], 2,2'-azobis(N-butyl-2-methylpropionamide), 2,2'-azobis(N-cyclohexyl-2-methylpropionamide), and the like (3) Cyclic Azoamidine Compounds:
2,2'-azobis[2-(2-imidazolin-2-yl)propane]dihydrochloride, 2,2'-azobis[2-(2-imidazolin-2-yl)propane]disulfate dihydrate, 2,2'-azobis[2-[1-(2-hydroxyethyl)-2-imidazolin-2-yl]propane]dihydrochloride, 2,2'-azobis[2-(2-imidazolin-2-yl)propane], 2,2'-azobis(1-imino-1-pyrrolidino-2-methylpropane) dihydrochloride, and the like (4) Azoamidine Compounds:
2,2'-azobis(2-methylpropionamidine) dihydrochloride, 2,2'-azobis[N-(2-carboxyethyl)-2-methylpropionamidine]tetrahydrate, and the like (5) Others:
dimethyl 2,2'-azobisisobutyrate, 4,4'-azobis(4-cyanovaleric acid), 2,2'-azobis(2,4,4-trimethylpentane), 1,1'-azobis(1-acetoxy-1-phenylethane), dimethyl 1,1'-azobis(1-cyclohexanecarboxylate), 4,4'-azobis(4-cyanopentanoic acid), and the like (6) Fluoroalkyl Group-Containing Azo-Based Polymerization Initiator:
4,4'-azobis(2-(perfluoromethyl)ethyl 4-cyanopentanoate), 4,4'-azobis(2-(perfluorobutyl)ethyl 4-cyanopentanoate), 4,4'-azobis(2-(perfluorohexyl)ethyl 4-cyanopentanoate), and the like Among these azo-based polymerization initiator, from the viewpoint of dispersibility of the obtained highly branched polymer to the component (b) and/or the component (c) and surface modification, 2,2'-azobis(2-methylbutyronitrile) or 2,2'-dimethyl azobisisobutyrate is preferable, and 2,2'-dimethyl azobisisobutyrate is particularly preferable.

The polymerization initiator C is used in an amount of 5% by mole to 200% by mole, preferably an amount of 20% by mole to 200% by mole, and more preferably an amount of 20% by mole to 100% by mole per the number of moles of the monomer A.

[Method for Producing Fluorine-Containing Highly Branched Polymer]

The fluorine-containing highly branched polymer (a) is obtained by polymerizing the monomer A and the monomer B in the presence of a predetermined amount of the polymerization initiator C per amount of the monomer A. Examples of the polymerization method include publicly known methods such as solution polymerization, dispersion polymerization, precipitation polymerization, and bulk polymerization. Among them, the solution polymerization or the precipitation polymerization is preferable. Particularly, in terms of the molecular weight control, the reaction is preferably carried out by the solution polymerization in an organic solvent.

Examples of the organic solvent used in the reaction include: aromatic hydrocarbon solvents such as benzene, toluene, xylene, ethylbenzene, and tetralin; aliphatic or alicyclic hydrocarbon solvents such as n-hexane, n-heptane, mineral spirits, and cyclohexane; halogen-based solvents such as methyl chloride, methyl bromide, methyl iodide, methylene dichloride, chloroform, carbon tetrachloride, trichloroethylene, perchloroethylene, and ortho-dichlorobenzene; ester or ester ether solvents such as ethyl acetate, butyl acetate, methoxybutyl acetate, methylcellosolve acetate, ethylcellosolve acetate, and propylene glycol monomethyl ether acetate; ether solvents such as diethyl ether, tetrahydrofuran, 1,4-dioxane, methylcellosolve, ethylcellosolve, butylcellosolve, and propylene glycol monomethyl ether; ketone solvents such as acetone, methyl ethyl ketone, methyl isobutyl ketone, di-n-butyl ketone, and cyclohexanone; alcohol solvents such as methanol, ethanol, n-propanol, isopropanol, n-butanol, isobutanol, tert-butanol, 2-ethylhexyl alcohol, benzyl alcohol, and ethylene glycol; amide solvents such as N,N-dimethylformamide and N,N-dimethylacetamide; sulfoxide solvents such as dimethylsulfoxide; heterocyclic compound solvents such as N-methyl-2-pyrrolidone; and a solvent mixture of two or more of these solvents.

Among them, the aromatic hydrocarbon solvent, the halogen-based solvent, the ester solvent, the ether solvent, the ketone solvent, the alcohol solvent, the amide solvent, and the like are preferable, and benzene, toluene, xylene, ortho-dichlorobenzene, ethyl acetate, butyl acetate, propylene glycol monomethyl ether acetate, propylene glycol monomethyl ether, tetrahydrofuran, 1,4-dioxane, methyl ethyl ketone, methyl isobutyl ketone, methanol, ethanol, n-propanol, isopropanol, n-butanol, isobutanol, tert-butanol, N,N-dimethylformamide, N,N-dimethylacetamide, N-methyl-2-pyrrolidone, and the like are particularly preferable.

When the polymerization reaction of the present invention is carried out in the presence of the organic solvent, a mass of the organic solvent is usually 5 parts by mass to 120 parts by mass, and preferably, 10 parts by mass to 110 parts by mass per 1 part by mass of the monomer A.

The polymerization reaction is carried out under normal pressure, under pressurized pressure in a closed system, or under reduced pressure, and in terms of easiness of apparatus and operations, the polymerization reaction is preferably carried out under normal pressure. The polymerization reaction is preferably carried out in inert gas atmosphere such as $N_2$.

A temperature for the polymerization reaction may be any temperature as long as the temperature is lower than or equal to a boiling point of the reaction mixture. In terms of polymerization efficiency and molecular weight control, the temperature is preferably 50° C. or higher and 200° C. or lower, further preferably 80° C. or higher and 150° C. or lower, and more preferably 80° C. or higher and 130° C. or lower.

A reaction time varies depending on the reaction temperature, the types and ratios of the monomer A, the monomer B, and the polymerization initiator C, and the polymerization solvent, and thus, cannot be generally defined. The reaction time, however, is preferably 30 minutes or more and 720 minutes or less, and more preferably 40 minutes or more and 540 minutes or less.

After the completion of the polymerization reaction, the obtained fluorine-containing highly branched polymer is recovered by an adequate method, and if needed, the highly branched polymer is subjected to post-treatment such as washing. Examples of the method for recovering the polymer from the reaction solution include a method of reprecipitation.

A weight average molecular weight (Mw) of the fluorine-containing highly branched polymer (a) measured by gel permeation chromatography in terms of polystyrene is 1,000 to 400,000, and preferably 2,000 to 200,000.

[(b) At Least One Surface Modifier Selected from the Group Consisting of Perfluoropolyether Compound and Silicone Compound]

From the viewpoint of dispersibility to the active energy ray-curable polyfunctional monomer (c), the at least one surface modifier (b) selected from the group consisting of a perfluoropolyether compound and a silicone compound is preferably a perfluoropolyether compound or a silicone compound modified with organic group(s) at one terminal or both terminals of the compound, and more preferably a perfluoropolyether compound or a silicone compound having (meth)acryloyl group(s). Particularly, the perfluoropolyether compound having (meth)acryloyl group(s) is preferable.

As specific examples of the surface modifier (b) used in the present invention, a compound including repeating units of —(O—$CF_2CF_2$)— or —(O—$CF_2CF(CF_3)$)— is preferable as the perfluoropolyether compound. Examples of the compound including these repeating units include both terminal alcohol-modified compounds: FOMBLIN (registered trademark) ZDOL 2000, FOMBLIN (registered trademark) ZDOL 2500, FOMBLIN (registered trademark) ZDOL 4000, FOMBLIN (registered trademark) ZDOL FOMBLIN (registered trademark) TX, FOMBLIN (registered trademark) ZTETRAOL 2000G, FOMBLIN (registered trademark) T, FLUOROLINK (registered trademark) D10H, and FLUOROLINK (registered trademark) E10H (every compound is manufactured by Solvay Solexis Corporation); both terminal piperonyl-modified compounds: FOMBLIN (registered trademark) AM2001 and FOMBLIN (registered trademark) AM3001 (every compound is manufactured by Solvay Solexis Corporation); a both terminal carboxylic acid-modified compound: FLUOROLINK (registered trademark) C10 (every compound is manufactured by Solvay Solexis Corporation); a both terminal ester-modified compound: FLUOROLINK (registered trademark) L10H (every compound is manufactured by Solvay Solexis Corporation); both terminal (meth)acrylic-modified compounds: FLUOROLINK (registered trademark) MD500, FLUOROLINK (registered trademark) MD700, FLUOROLINK (registered trademark) 5101X, and FLUOROLINK (registered trademark) AD1700 (every compound is manufactured by Solvay Solexis Corporation), and CN4000 (manufactured by Sartomer Company, Inc.).

Among them, the both terminal (meth)acrylic-modified compounds are preferable, and FLUOROLINK (registered trademark) MD500, FLUOROLINK (registered trademark)

MD700, FLUOROLINK (registered trademark) 5101X, and FLUOROLINK (registered trademark) AD1700 are particularly preferable.

As specific examples of the surface modifier (b), a compound including the repeating unit of —(O—Si(CH$_3$)$_2$—Si (CH$_3$)$_2$)— is preferable as the silicone compound. Examples of the compound including these repeating units include the following compounds:

both terminal polyether modified compounds: BYK-300, 301, 302, 306, 307, 310, 320, 325, 330, 331, 333, 337, 341, 344, 378, and UV3510; both terminal polyester-modified compounds: BYK-310, 315, and 313; a both terminal polyester-modified hydroxy group-containing compound: BYK-370; a both terminal polyether-ester-modified hydroxy group-containing compound: BYK-375; a both terminal polyether-modified hydroxy group-containing compound: BYK-377; and both terminal (meth)acrylic-modified compounds: BYK-UV3500 and 3570 (these compounds are manufactured by BYK Japan KK);

both terminal alcohol-modified compounds: Shin-Etsu Silicone (registered trademark) X-22-160AS, KF-6001, KF-6002, KF-6003; both terminal (meth)acrylic-modified compounds: Shin-Etsu Silicone (registered trademark) X-22-164, X22-164AS, X-22-164A, X-22-164B, X-22-164C, X-22-164D, and X-22-164E; both terminal ether-modified compounds: Shin-Etsu Silicone (registered trademark) X-22-4952, X-22-4272, and X-22-6266; a both terminal carboxy-modified compound: Shin-Etsu Silicone (registered trademark) X-22-162C; single terminal alcohol-modified compounds: Shin-Etsu Silicone (registered trademark) X-22-170BX, X-22-170DX, X-22-176DX, and X-22-176F; single terminal (meth)acrylic-modified compounds: Shin-Etsu Silicone (registered trademark) X-22-174DX, X-22-2426, and X-22-2475; and a single terminal carboxy-modified compound: Shin-Etsu Silicone (registered trademark) X-22-3710 (these compounds are manufactured by Shin-Etsu Chemical Co., Ltd.);

both terminal alcohol-modified compounds: Silaplane (registered trademark) FM-4411, FM-4421, and FM-4425; both terminal (meth)acrylic-modified compounds: Silaplane (registered trademark) FM-7711, FM-7721, and FM-7725; single terminal alcohol-modified compounds: Silaplane (registered trademark) FM-0411, FM-0421, FM-0425, FM-DA11, FM-DA21, and FA-DA26; and single terminal (meth)acrylic-modified compounds: Silaplane (registered trademark) FM-0711, FM-0721, FM-0725, TM-0701, and TM-0701T (these compounds are manufactured by Chisso Corporation).

Among them, the both terminal (meth)acrylic-modified compounds are preferable, and BYK-UV 3500 is particularly preferable.

In the curable composition for coating of the present invention, the surface modifier (b) is used in an amount of 0.001% by mass to 20% by mass, preferably an amount of 0.005% by mass to 10% by mass, and particularly preferably an amount of 0.01% by mass to 5% by mass per mass of the polyfunctional monomer (c) described below.

[(c) Active Energy Ray-Curable Polyfunctional Monomer]

Examples of the active energy ray-curable polyfunctional monomer (c) include polyfunctional monomers containing two or more (meth) acryloyl groups such as an urethane acrylic-based monomer, an epoxy acrylic-based monomer, and various (meth)acrylate-based monomers.

Preferably, the polyfunctional monomer (c) is at least one monomer selected from the group consisting of a polyfunctional (meth)acrylate compound and a polyfunctional urethane (meth)acrylate compound.

Examples of this active energy ray-curable polyfunctional monomer include hexanediol di(meth)acrylate, neopentyl glycol di(meth)acrylate, triethylene glycol di(meth)acrylate, polyethylene glycol di(meth)acrylate, poly(propylene glycol) di(meth)acrylate, pentaerythritol di(meth)acrylate monostearate, bisphenol A ethylene glycol adduct (meth) acrylate, bisphenol F ethylene glycol adduct (meth)acrylate, tricyclo[5.2.1.0$^{2,6}$]decanemethanol di(meth)acrylate, tris (hydroxyethyl)isocyanurate di(meth)acrylate, trimethylolpropane tri(meth)acrylate, trimethylolpropane ethylene glycol adduct tri(meth)acrylate, trimethylolpropane propylene glycol adduct tri(meth)acrylate, pentaerythritol tri(meth) acrylate, tris((meth)acryloyloxyethyl) phosphate, tris(hydroxyethyl)isocyanurate tri(meth)acrylate, modified ε-caprolactone tri(meth)acrylate, trimethylolpropane ethoxy tri(meth)acrylate, glycerin propylene glycol adduct tris (meth)acrylate, pentaerythritol tetra(meth)acrylate, pentaerythritol ethylene glycol adduct tetra(meth)acrylate, ditrimethylolpropane tetra(meth)acrylate, dipentaerythritol hexa(meth)acrylate, dipentaerythritol monohydroxy penta (meth)acrylate, urethane (meth)acrylates, epoxy (meth)acrylates, polyester (meth)acrylates, and unsaturated polyesters.

In the curable composition for coating of the present invention, a formulation amount of the fluorine-containing highly branched polymer (a) to the active energy ray-curable polyfunctional monomer (c) are as follows. The fluorine-containing highly branched polymer (a) is used in an amount of 0.001% by mass to 20% by mass, preferably, 0.005% by mass to 15% by mass, particularly preferably, 0.01% by mass to 10% by mass per mass of the polyfunctional monomer (C).

[(d) Polymerization Initiator that Generates Radicals by Irradiation with the Active Energy Rays]

As the polymerization initiator that generates radicals by irradiation with the active energy rays (d), for example, alkylphenones, benzophenones, ketals, anthraquinones, thioxanthones, azo compounds, peroxides, 2,3-dialkyldione compounds, disulfide compounds, thiuram compounds, and fluoroamine compounds are used. Among them, the alkylphenones, particularly, α-hydroxy alkylphenones are preferably used. More specifically, 1-hydroxycyclohexyl phenyl ketone, 2-hydroxy-1-{4-[4-(2-hydroxy-2-methylpropionyl) benzyl]phenyl}-2-methylpropan-1-one, 2-methyl-1-[4-(methylthio)phenyl]-2-morpholinopropan-1-one, benzyl dimethyl ketone, 1-(4-dodecylphenyl)-2-hydroxy-2-methylpropan-1-one, 2-hydroxy-2-methyl-1-phenylpropan-1-one, 1-(4-isopropylphenyl)-2-hydroxy-2-methylpropan-1-one, 2,2-dimethoxy-1,2-diphenylethan-1-one, 1-[4-(2-hydroxyethoxy)phenyl]-2-hydroxy-2-methyl-1-propan-1-one, 2-benzyl-2-dimethylamino-1-(4-morpholinophenyl)-1-butanone, 2-dimethylamino-2-[(4-methylphenyl)methyl]-1-[4-(4-morpholinyl)phenyl]-1-butanone, 2,4,6-trimethylbenzoyldiphenylphosphineoxide, bis(2,4,6-trimethylbenzoyl) phenylphosphineoxide, 2-benzoyloxyimino-1-[4-(phenylthio)phenyl]octan-1-one, 1-{[9-ethyl-6-(2-methylbenzoyl)-9H-carbazol-3-yl] ethylideneaminooxy}ethanone, and benzophenone can be exemplified. Among them, 1-hydroxycyclohexyl phenyl ketone, 2-hydroxy-1-{[4-(2-hydroxy-2-methylpropionyl) benzyl]phenyl}-2-methylpropane-1-one, and 2-methyl-1-[4-(methylthio)phenyl]-2-morpholinopropan-1-one are preferable because these polymerization initiators initiate and promote the polymerization reaction by irradiation with ionization radiation even in small quantities. These polymerization initiators can be used singly or in combination. These polymerization initiators are commercially available.

In the curable composition for coating of the present invention, the polymerization initiator (d) is used in an amount of 0.01% by mass to 20% by mass, preferably, an amount of 0.1% by mass to 20% by mass, and particularly preferably, an amount of 1% by mass to 20% by mass per mass of the polyfunctional monomer (c).

[(e) Silica Fine Particles]

The curable composition for coating of the present invention may further include the silica fine particles (e).

The average particle diameter of the silica fine particles used herein is preferably 1 nm to 100 nm. Silica fine particles having an average particle diameter exceeding 100 nm may cause reduction in transparency of the cured film formed from the prepared curable composition. The average particle diameter described herein is an average particle diameter obtained by the measurement by dynamic light scattering (DLS) and a direct observation method using transmission electron microscopy (TEM).

Colloidal solution silica fine particles are preferable as the silica fine particles. The colloidal solution may be a colloidal solution prepared by dispersing silica fine particles in a dispersion medium, or may be commercially available colloidal silica. In the present invention, the surface shape of or other functions of the cured film to be formed can be provided by containing the silica fine particles in the curable composition.

Examples of the dispersion medium of the silica fine particles include water and an organic solvent. Particularly, in the present invention, an organosilica sol dispersed in the organic solvent is preferably used.

Examples of the organic solvent used in the dispersion medium include alcohols such as methanol, isopropyl alcohol, ethylene glycol, butanol, and ethylene glycol mono propyl ether; ketones such as methyl ethyl ketone and methyl isobutyl ketone; aromatic hydrocarbons such as toluene and xylene; amides such as dimethylformamide, dimethylacetamide, and N-methylpyrrolidone; esters such as ethyl acetate, butyl acetate, and γ-butyrolactone; and ethers such as tetrahydrofuran and 1,4-dioxane. Among them, the alcohols and the ketones are preferable. These organic solvents may be used as a dispersion medium singly or in combination of two or more solvents.

When the silica fine particles are contained, an amount of the silica fine particles (e) in the curable composition for coating of the present invention is 5% by mass to 80% by mass, preferably, 5% by mass to 70% by mass, and particularly preferably, 5% by mass to 60% by mass per mass of the polyfunctional monomer (c).

[Solvents]

The curable composition for coating of the present invention may also be in the form of varnish by further including a solvent. The solvent used in this case may be a solvent that dissolves the components (a) to (d). For example, ethylene glycol monomethyl ether, ethylene glycol monoethyl ether, methyl cellosolve acetate, ethyl cellosolve acetate, diethylene glycol monomethyl ether, diethylene glycol monoethyl ether, propylene glycol, propylene glycol monomethyl ether, propylene glycol monomethyl ether acetate, propylene glycol propyl ether acetate, toluene, xylene, methyl ethyl ketone, methyl isobutyl ketone, cyclopentanone, cyclohexanone, ethyl 2-hydroxypropionate, ethyl 2-hydroxy-2-methylpropionate, ethyl ethoxyacetate, ethyl hydroxyacetate, methyl 2-hydroxy-3-methylbutanoate, methyl 3-methoxypropionate, ethyl 3-methoxypropionate, ethyl 3-ethoxypropionate, methyl 3-ethoxypropionate, methyl pyruvate, ethyl pyruvate, ethyl acetate, butyl acetate, ethyl lactate, butyl lactate, N, N-dimethylformamide, N, N-dimethylacetamide, N-methyl-2-pyrrolidone, and, γ-butyrolactone can be used. These solvents can be used singly or in combination of two or more solvents.

Depending on the situation using the curable composition for coating, when the curable composition for coating containing no solvent is desired, active energy ray-curable monomers that are different from the polyfunctional monomer (c) may be added as a diluent. These diluent monomers are not particularly limited as long as the monomers are compatible with the components (a) to (d). For example, (meth) acrylates such as methyl (meth)acrylate, tetrahydrofurfuryl (meth)acrylate, cyclohexyl (meth)acrylate, cyclohexyloxymethyl (meth)acrylate, tricyclo[5.2.1.0$^{2,6}$]decanyl (meth)acrylate (also called dicyclopentanyl (meth)acrylate), tricyclo[5.2.1.0$^{2,6}$]deca-3-enyl (meth)acrylate (also called dicyclopentenyl (meth)acrylate), 2-(tricyclo[5.2.1.0$^{2,6}$]deca-3-enyloxy)ethyl (meth)acrylate (also called dicyclopentenyloxyethyl (meth)acrylate), (2-ethyl-2-methyl-1,3-dioxolan-4-yl)methyl (meth)acrylate, (2-isobutyl-2-methyl-1,3-dioxolan-4-yl)methyl (meth)acrylate, 1,4-dioxaspiro[4.5]decan-2-ylmethyl (meth)acrylate, and benzyl (meth)acrylate can be used.

A solid content in the curable composition for coating of the present invention is, for example, 0.5% by mass to 80% by mass, 1% by mass to 70% by mass, or 1% by mass to 60% by mass. The solid content means components obtained by removing the solvent component from the whole components of the curable composition for coating.

[Other Additives]

In the curable composition for coating of the present invention, additives that are generally added can be adequately formulated, if needed, as long as the additives do not impair the effects of the present invention. Examples of these additives include photosensitizers, polymerization inhibitors, polymerization initiators, leveling agents, surfactants, adhesion imparting agents, plasticizers, ultraviolet absorbers, antioxidants, storage stabilizers, antistatic agents, inorganic fillers, pigments, and dyes.

<Cured Product>

The curable composition for coating of the present invention can form molded products such as a cured film and a stacked product by applying the composition onto a substrate and carrying out photopolymerization (curing). The cured film thus obtained is also an object of the present invention.

Examples of the substrate may include plastics (for example, polycarbonate, polymethacrylate, polystyrene, polyester, polyolefin, epoxy, melamine, triacetylcellulose, ABS, AS, and a norbornene-based resin), metals, wood, paper, glass, and slate. Shapes of these substrates may be a plate-like shape, a film-like shape, or three-dimensional molded part.

Coating methods for the curable composition for coating of the present invention can be adequately selected from a cast coating method, a spin coating method, a blade coating method, a dip coating method, a roll coating method, a bar coating method, a die coating method, an inkjet method, a printing method (such as anastatic printing, intaglio printing, planographic printing, and screen printing) and a spray coating method. Among them, the spin coating method is desirably used because the method has advantages such that a solution having high volatility can be used because the solution can be applied in a short period of time, and highly uniform coating can be carried out. As the curable composition for coating used herein, a composition in the form of the varnish described above can be suitably used. The curable composition for coating is preferably applied for coating after the curable composition for coating is previously filtered using a filter having a pore size of about 0.2 μm.

After the coating, preferably, the coating film is subsequently pre-dried using a hot plate or an oven, and then, the coating film is light cured by irradiation with active rays such as ultraviolet rays. Examples of the active rays include ultraviolet rays, electron beams, and X rays. As a light source used for the ultraviolet irradiation, for example, sun rays, a chemical lamp, a low-pressure mercury lamp, a high-pressure mercury-vapor lamp, a metal halide lamp, and a xenon lamp can be used.

Subsequently, the polymerization can be completed by carrying out post-baking, specifically, applying heat with a hot plate, an oven, or the like.

After drying and curing, the thickness of the film formed by coating is usually 0.01 µm to 50 µm, and preferably, 0.05 µm to 20 µm.

<Hard Coating Film>

A hard coating film having a hard coating layer on at least one surface of a film substrate, in which the hard coating layer is formed by forming a coating film by applying the curable composition for coating of the present invention on a film substrate; drying the coating film to remove a solvent; and irradiating the coating film with ultraviolet rays to cure the coating film, is also an object of the present invention.

A substrate, a coating method, and ultraviolet irradiation used herein are the same as the substrate, the film coating method, and the ultraviolet irradiation described in <Cured product>.

In the hard coating film, the film thickness of the hard coating layer is preferably 1 µm to 30 µm.

The hard coating film obtained from the curable composition for coating of the present invention has not only the antifouling properties such as the anti-fingerprint property and the felt pen ink wiping off property but also durability for the antifouling properties seen in the solvent wiping resistance.

Because of this, the hard coating film of the present invention is useful for a hard coating layer material for the surfaces of various displays such as liquid crystal displays (LCDs), plasma display panels (PDPs), and touch panels.

In the present invention, the anti-fingerprint property means a performance that includes a property that fingerprints are intrinsically difficult to attach, and in addition, that fingerprints are difficult to be found after the fingerprints are attached, and the attached fingerprints are easily removed by wiping.

The felt pen ink wiping resistance means that when a surface is fouled with felt pen ink, the felt pen ink is easily removed by wiping.

EXAMPLES

Hereinafter, the present invention will be described in more detail with reference to Examples. The present invention, however, is not limited to the following Examples.

In Examples, equipment and conditions used for preparing samples and analyzing physical properties are as follows.
(1) Gel Permeation Chromatography (GPC)
  Equipment: HLC-8220GPC, manufactured by Tosoh Corporation
  Column: Shodex KF-804L and KF-805L
  Column temperature: 40° C.
  Solvent: Tetrahydrofuran
  Detector: RI
(2) $^1$H NMR Spectrometer and $^{13}$C NMR Spectrometer
  Equipment: JNM-ECA700, manufactured by JEOL Ltd.
  Solvent: CDCl$_3$
  Internal standard: Tetramethylsilane
(3) Ion Chromatography (Fluorine Quantitative Analysis)
  Equipment: ICS-1500, manufactured by Nippon Dionex K.K.
  Solvent: (2.7 mmol Na$_2$CO$_3$+0.3 mmol NaHCO$_3$)/L aqueous solution
  Detector: electric conductivity
(4) Spin Coater
  Equipment: MS-A100, manufactured by Mikasa Co., Ltd.
(5) Ellipsometry (Refractive Index and Film Thickness Measurement)
  Equipment: EC-400, manufactured by J.A. Woollam Co., Inc.
(6) Contact Angle Measurement
  Equipment: VCA Optima, manufactured by AST Products, Inc.
  Measurement temperature: 20° C.
  Measurement method: a contact angle after 10 seconds from dropping a measurement medium to the surface to be measured was measured 5 times, and a contact angle value was determined as an average value of three measured values excluding the maximum and minimum values.
(7) Glass Transition Temperature (Tg) Measurement
[Highly Branched Polymers 1 and 2]
  Equipment: Diamond DSC, manufactured by PerkinElmer Inc.
  Measurement condition: under nitrogen atmosphere
  Temperature rise rate: 5° C./min (25° C. to 160° C.)
[Highly Branched Polymer 3]
  Equipment: TGA/DSC1, manufactured by Mettler-Toledo, International Inc.
  Measurement condition: under nitrogen atmosphere
  Temperature rise rate: 10° C./min (30° C. to 300° C.)
(8) Measurement of Temperature at 5% Weight Loss (Td$_{5\%}$)
  Equipment: TG8120, manufactured by Rigaku Corporation
  Measurement condition: under air atmosphere
  Temperature rise rate: 10° C./min (25° C. to 500° C.)
(9) UV Irradiation Equipment
  Equipment: H02-L41, manufactured by Eye Graphics Co., Ltd.
  Intensity: 16 mW/cm$^2$ (365 nm)
(10) Hazemeter (Total Light Transmittance and Turbidity Measurement)
  Equipment: NDH5000, Nippon Denshoku Industries Co., Ltd.
(11) Wire Bar Coater
  Equipment: PM-9050MC, manufactured by SMT Co., LTD.

Abbreviations represent the following meanings.
EGDMA: Ethylene glycol dimethacrylate [1G, manufactured by Shin-Nakamura Chemical Co., Ltd.]
EB4858: Isophorone-based di(urethane acrylate) [EBECRYL4858, manufactured by DAICEL-CYTEC Company Ltd.]
C6FA: 2-(perfluorohexyl)ethyl acrylate [R-1620, manufactured by Daikin Chemicals Sales Co., Ltd.]
VEEA: 2-(2-vinyloxyethoxy)ethyl acrylate [VEEA, manufactured by Nippon Shokubai Co., Ltd.]
SXMA: 3-tris(trimethoxysiloxy)silylpropyl methacrylate [Shin-Etsu Silicone (registered trademark) X-22-2404, manufactured by Shin-Etsu Chemical Co., Ltd.]
MAIB: 2,2'-azobis(methyl isobutyrate) [MAIB, manufactured by Otsuka Chemical Co., Ltd.]
Irg. 127: 2-hydroxy-1-{4-[4-(2-hydroxy-2-methylpropionyl)benzyl]phenyl}-2-methyl-propan-1-one [Irgacure127, manufactured by BASF Japan Ltd.]
Irg. 184: 1-hydroxycyclohexyl phenyl ketone [Irgacure184, manufactured by BASF Japan Ltd.]
Irg. 907: 2-methyl-1-(4-methylthiophenyl)-2-morpholinopropan-1-one [Irgacure 907, manufactured by BASF Japan Ltd.]
Silicone 1: Silicone-based surface conditioner [BYK-UV3500, manufactured by BYK Japan KK]
PFPE-1: Perfluoropolyether [AD-1700, manufactured Solvay Solexis Corporation]
PFPE-2: Perfluoropolyether [MD-700, manufactured by Solvay Solexis Corporation]
PFPE-3: Perfluoropolyether [5101X, manufactured by Solvay Solexis Corporation]

F-552: Fluorine group-containing and lipophilic group-containing linear oligomer [MEGAFAC F-552, manufactured by DIC Corporation]

A-DPH: 5- or 6-functional acrylate [A-DPH, manufactured by Shin-Nakamura Chemical Co., Ltd.]

UA-306H: 6-functional urethane acrylate [UA-306H, manufactured by Kyoeisha Chemical Co., Ltd.]

UA-306I: 6-functional urethane acrylate [UA-306I, manufactured by Kyoeisha Chemical Co., Ltd.]

UV7620: Polyfunctional urethane acrylate [Shikoh (registered trademark) UV-7620EA, manufactured by Nippon Synthetic Chemical Industry Co., Ltd.]

UV7600: Polyfunctional urethane acrylate [Shikoh (registered trademark) UV-7600B, manufactured by Nippon Synthetic Chemical Industry Co., Ltd.]

BS575: Polyfunctional urethane acrylate [BEAMSET 575, manufactured by Arakawa Chemical Industries, Ltd.]

THF-A: Tetrahydrofurfuryl acrylate [THF-A, manufactured by Kyoeisha Chemical Co., Ltd.]

SK1110: Non-solvent type acrylic UV curable hard coating agent [SK1110, manufactured by Sony Chemical & Information Device Corporation]

UR6530: Non-solvent type acrylic UV curable hard coating agent [UR6530, manufactured by Mitsubishi Rayon Co., Ltd.]

RS75: Perfluoropolyether-based surface modifier [MEGAFAC RS-75 (40% by mass MEK/MIBK solution), manufactured by DIC Corporation]

DAC-HP: Perfluoropolyether-based surface modifier [Optool (trademark) DAC-HP (20% by mass fluorine-based solvent solution), manufactured by Daikin Industries Ltd.]

MIBK: Isobutyl methyl ketone

THF: Tetrahydrofuran

[Synthesis Example 1] Synthesis of Highly Branched Polymer 1

To a 200 mL reaction flask, 59 g of toluene was charged and nitrogen was introduced for 5 minutes with stirring. The internal liquid was heated (to a temperature of approximately 110° C.) until the internal liquid was refluxed.

To another 100 mL reaction flask, 4.0 g of EGDMA (20 mmol), 5.2 g of C6FA (13 mmol), 1.9 g of VEEA (10 mmol), 2.8 g of MAIB (12 mmol), and 59 g of toluene were charged, and the inside of the reaction flask was purged with flowing nitrogen by introducing nitrogen for 5 minutes with stirring. Subsequently, the mixture was cooled to 0° C. in an ice bath.

Into the refluxed toluene in the 200 mL reaction flask described above, the mixture was added dropwise over 30 minutes using a dropping pump from the 100 mL reaction flask in which EGDMA, C6FA, VEEA, and MAIB were charged. After completion of the dropwise addition, the mixture was aged for 1 hour.

Subsequently, after 28 g of toluene was distilled away from this reaction liquid using a rotary evaporator, the residue was added to 277 g of hexane to precipitate a polymer in a slurry state. The slurry was filtered under reduced pressure and the filtered residue was dried in vacuo to obtain 6.6 g of the target product (highly branched polymer 1) as a white powder (yield 65%).

Figure 2:
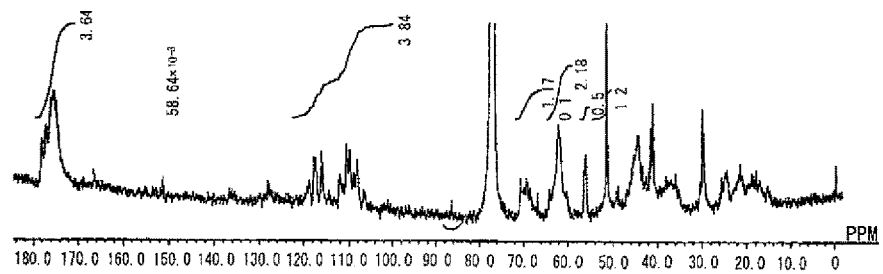
FIG. 2 is a chart illustrating $^{13}$C NMR spectrum of the highly branched polymer 1 produced in Synthesis Example 1.

$^1$H NMR and $^{13}$C NMR spectra of the obtained target product are shown in FIGS. 1 and 2. A weight average molecular weight Mw of the target product measured by GPC in terms of polystyrene was 8,400, and the degree of distribution: Mw (weight average molecular weight)/Mn (number average molecular weight) was 2.5.

[Synthesis Example 2] Synthesis of Highly Branched Polymer 2

To a 200 mL reaction flask, 32 g of toluene was charged and nitrogen was introduced for 5 minutes with stirring. The internal liquid was heated (to a temperature of approximately 110° C.) until the internal liquid was refluxed.

To another 100 mL reaction flask, 4.0 g of EGDMA (20 mmol), 4.3 g of C6FA (10 mmol), 4.3 g of SXMA (10 mmol), 2.3 g of MAIB (10 mmol), and 32 g of toluene were charged, and the inside of the reaction flask was purged with flowing nitrogen by introducing nitrogen for 5 minutes with stirring. Subsequently, the mixture was cooled to 0° C. in an ice bath.

Into the refluxed toluene in the 200 mL reaction flask described above, the mixture was added dropwise over 20 minutes using a dropping pump from the 100 mL reaction flask in which EGDMA, C6FA, SXMA, and MAIB were charged. After completion of the dropwise addition, the mixture was aged for 1 hour.

Subsequently, after 57 g of toluene was distilled away from this reaction liquid using a rotary evaporator, the residue was added to 284 g of hexane to precipitate a polymer in a slurry state. The slurry was filtered under reduced pressure and the filtered residue was dried in vacuo to obtain 7.6 g of the target product (highly branched polymer 2) as a white powder (yield 53%).

Figure 3:
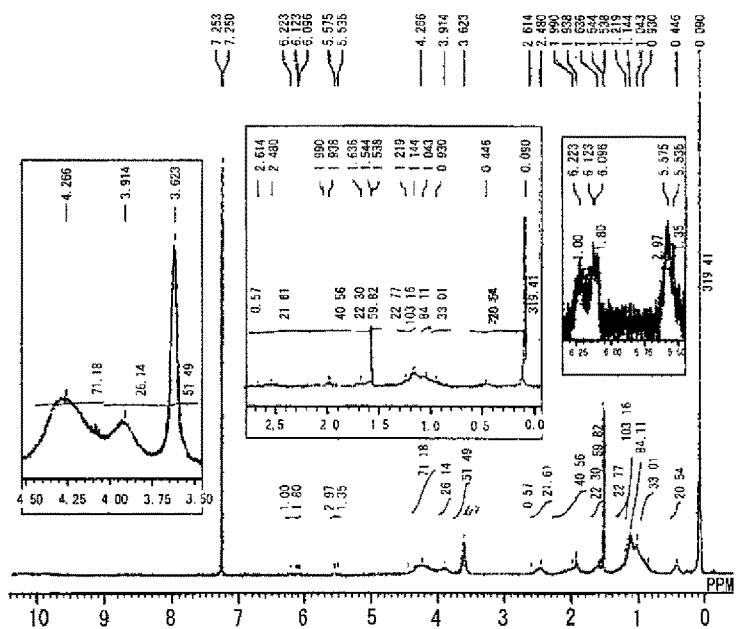
FIG. 3 is a chart illustrating $^1$H-NMR spectrum of a highly branched polymer 2 produced in Synthesis Example 2.
Figure 4:
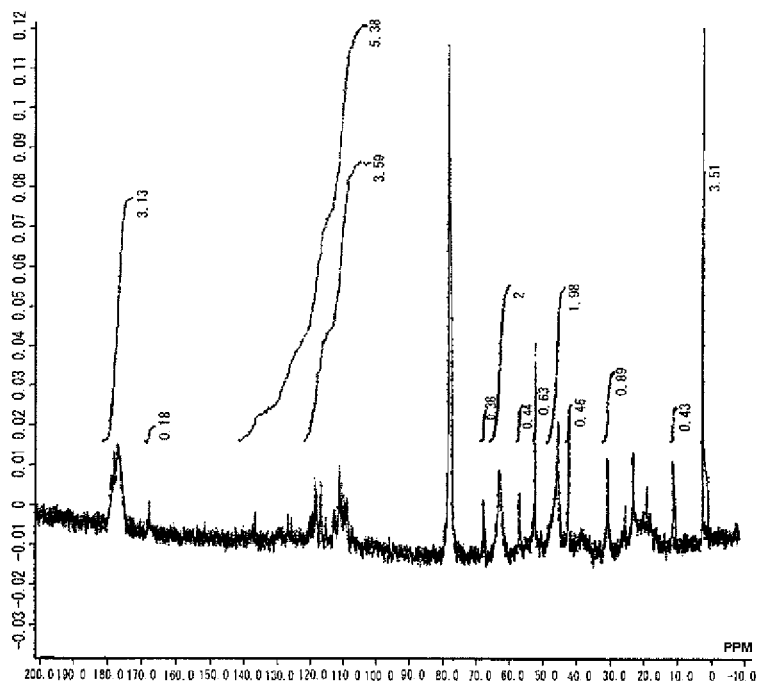
FIG. 4 is a chart illustrating $^{13}$C NMR spectrum of the highly branched polymer 2 produced in Synthesis Example 2.

$^1$H NMR and $^{13}$C NMR spectra of the obtained target product are shown in FIGS. 3 and 4. A weight average molecular weight Mw of the target product measured by GPC in terms of polystyrene was 13,000, and the degree of distribution Mw/Mn was 2.1.

[Synthesis Example 3] Synthesis of Highly Branched Polymer 3

To a 300 mL reaction flask, 54 g of MIBK was charged and nitrogen was introduced for 5 minutes with stirring. The internal liquid was heated (to a temperature of approximately 116° C.) until the internal liquid was refluxed.

To another 100 mL reaction flask, 9.0 g of EB4858 (20 mmol), 5.9 g of C6FA (14 mmol), 2.3 g of MAIB (10 mmol), and 54 g of MIBK were charged, and the inside of the reaction flask was purged with flowing nitrogen by introducing nitrogen for 5 minutes with stirring. Subsequently, the mixture was cooled to 0° C. in an ice bath.

Into the refluxed MIBK in the 300 mL reaction flask described above, the mixture was added dropwise over 30 minutes using a dropping pump from the 100 mL reaction flask in which EB4858, C6FA, and MAIB were charged. After completion of the dropwise addition, the mixture was aged for 1 hour.

Subsequently, after 35 g of MIBK was distilled away from this reaction liquid using a rotary evaporator, the residue was added to 450 g of ice-cooled hexane to precipitate a polymer. The precipitate was isolated by decantation. The obtained crude product was dissolved in 18 g of THF and was again added to 450 g of ice-cooled hexane to precipitate the polymer. The precipitate was isolated by decantation. The obtained polymer was dissolved in 18 g of THF again, the solvent of the solution was removed under reduced pressure, and the residue was dried in vacuo to obtain 12.0 g of the target product (highly branched polymer 3) as a white powder (yield 71%).

Figure 5:
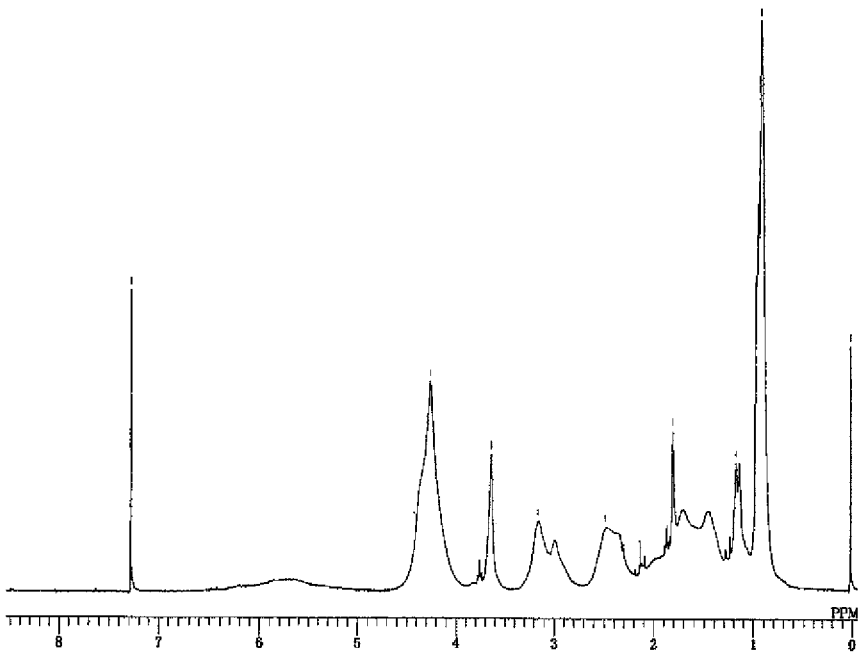
FIG. 5 is a chart illustrating $^1$H NMR spectrum of a highly branched polymer 3 produced in Synthesis Example 3.
Figure 6:
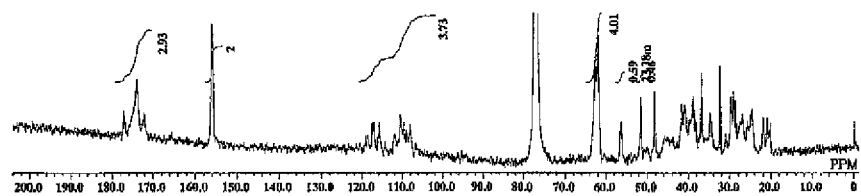
FIG. 6 is a chart illustrating $^{13}$C NMR spectrum of the highly branched polymer 3 produced in Synthesis Example 3.

$^1$H NMR and $^{13}$C NMR spectra of the obtained target product are shown in FIGS. 5 and 6. A weight average molecular weight Mw of the target product measured by GPC in terms of polystyrene was 3,900, and the degree of distribution Mw/Mn was 1.8.

The types and the charged amounts [% by mole] of each monomer and initiator (the monomer B, the other monomers, and the polymerization initiator C) per monomer A, weight average molecular weights Mw, degrees of distribution Mn/Mn, introduced amounts of fluorine-based monomer (the monomer B) calculated from $^{13}$C NMR spectrum [% by mole], and fluorine atom contents calculated from fluorine quantitative analysis [% by mass], of the highly branched polymers 1 to 3 obtained in Synthesis examples 1 to 3 are listed in Table 1.

TABLE 1

| Highly branched polymer | Monomer A | Monomer B Type | Monomer B Charged amount [% by mole] | Other monomer Type | Other monomer Charged amount [% by mole] | Initiator C Type | Initiator C Charged amount [% by mole] | Mw | Mw/Mn | Introduced amount of monomer B [% by mole] | F atom content [% by weight] |
|---|---|---|---|---|---|---|---|---|---|---|---|
| 1 | EGDMA | C6FA | 63 | VEEA | 50 | MAIB | 60 | 8,400 | 2.5 | 21 | 21 |
| 2 | EGDMA | C6FA | 50 | SXMA | 50 | MAIB | 50 | 13,000 | 2.1 | 23 | 18 |
| 3 | EB4858 | C6FA | 70 | None | — | MAIB | 50 | 3,900 | 1.8 | 33 | 17 |

[Evaluation of Physical Properties of Each Highly Branched Polymer]

The highly branched polymers 1 to 3 obtained in Synthesis examples 1 to 3, each 0.25 g, were each dissolved in 4.75 g of toluene, and each of the resultant solutions was filtered using a filter to prepare each highly branched polymer solution. The highly branched polymer solution was applied onto a silicon wafer by spin coating (slope for 5 seconds, and subsequently, rotation at 1,500 rpm for 30 seconds, and further slope for 5 seconds), and the solvent was evaporated by treating the coated film with heat at 100° C. for 30 minutes to form a film.

A refractive index at a wavelength of 633 nm and the contact angles of water, diiodomethane, and oleic acid of the obtained thin film were evaluated. The surface energy was also calculated from the result of the contact angles. The glass transition temperature (Tg) and the temperature at 5% weight loss (Td %) of each highly branched polymer powder were measured. The obtained result is listed in Table 2.

MIBK were mixed and the mixture was dissolved with stirring to prepare a homogeneous curable composition (refer to Table 3).

The curable composition was applied on a glass substrate having a size of 5 cm×5 cm by spin coating (slope for 5 seconds, and subsequently, rotation at 1,500 rpm for 30 seconds, and further slope for 5 seconds) to obtain a coating film. After the solvent of the obtained coating film was removed by drying for 3 minutes using a hot plate at 80° C., a hard coating film having a film thickness of about 5 mm to 10 mm was prepared by irradiating and exposing the coating film with UV light having an exposure amount of 500 mJ/cm$^2$ under nitrogen atmosphere.

The contact angle of oleic acid and the HAZE value of the obtained hard coating film were measured to evaluate an antifouling property and transparency, respectively. An ethanol-impregnated nonwoven fabric wiper [BEMCOT (trademark) M-1, manufactured by Asahi Kasei Fibers Corporation] was reciprocated on the surface of the obtained hard coating film each 3 times, 50 times, and 100 times for

TABLE 2

| Polymer | Tg [° C.] | Td$_{5\%}$ [° C.] | Film thickness [nm] | Refractive index (633 nm) | Contact angle [degree] H$_2$O | CH$_2$I$_2$ | Oleic acid | Surface energy [mJ/m$^2$] |
|---|---|---|---|---|---|---|---|---|
| Highly branched polymer 1 | 64.6 | 261.2 | 185.2 | 1.459 | 104.2 | 70.9 | 73.2 | 22.4 |
| Highly branched polymer 2 | 60.0 | 253.6 | 182.4 | 1.458 | 106.8 | 68.3 | 63.9 | 24.0 |
| Highly branched polymer 3 | 49.2 | 273.9 | 108.1 | 1.473 | 102.0 | 71.3 | 72.6 | 22.2 |

[Example 1] Preparation and Evaluation of Urethane Acrylate Hard Coating Film 2.4 g of urethane acrylate [UX-5000, manufactured by Nippon Kayaku Co., Ltd.], 2.0 g of 30% by mass silica sol dispersion in MIBK [MIBK-SD, manufactured by Nissan Chemical Industries, Ltd.], 15 mg of the highly branched polymer 1 obtained in Synthesis Example 1 as a fluorine-containing highly branched polymer (0.5 parts per total mass of the urethane acrylate and the solid content of the silica sol as 100 parts), 15 mg of PFPE-1 as a surface modifier (0.5 parts in the same manner), 150 mg of Irg. 184 as a polymerization initiator (5 parts in the same manner), and 1.6 g of wiping. After the ethanol was volatilized with an air gun, a contact angle with oleic acid was measured again. After a steel wool [#1000, manufactured by Nippon Steel Wool Co, Ltd.] applied with a load of 1 kg was reciprocated on the surface of the obtained hard coating film 5 times for rubbing, a HAZE value was measured again. A line was written on the surface of the hard coating film with a felt pen [Magic ink (black) extra-fine, manufactured by Teranishi Chemical Industry Co., Ltd.], and after 30 seconds, the surface was wiped with a nonwoven fabric wiper [BEMCOT (trademark) M-1, manufactured by Asahi Kasei Fibers Corporation]. The wiping off property of the line written with the felt pen was visually evaluated. The result is listed in Table 4 together with the other results.

[Criteria of Visual Evaluation of Felt Pen Ink Wiping Off Property]
○: Written line is completely erased.
Δ: Written line is almost erased.
x: Written line is not erased at all.

[Examples 2 to 4] Preparation and Evaluation of Urethane Acrylate Hard Coating Films Similar operations to Example 1 were carried out for each Example except that the type and the amount of the fluorine-containing highly branched polymer, the type and the amount of the surface modifier, the type and the amount of the polymerization initiator, and curing (exposure) atmosphere listed in Table 3 were changed, and the obtained hard coating films were evaluated in a similar manner. The result is listed in Table 4 together with the other results.

[Comparative Examples 1 to 5] Preparation and Evaluation of Urethane Acrylate Hard Coating Film Similar operations to Example 1 were carried out for each Example except that the type and the amount of the added polymer, the type and the amount of the surface modifier, and curing (exposure) atmosphere listed in Table 3 were changed, and the obtained hard coating films were evaluated in a similar manner. The result is listed in Table 4 together with the other results.

TABLE 3

| | Highly branched polymer | | Surface modifier 1 | | Surface modifier 2 | | Polymerization initiator 1 | | Polymerization initiator 2 | | Curing |
|---|---|---|---|---|---|---|---|---|---|---|---|
| | Type | Amount* [Part] | Type | Amount* [Part] | Type | Amount* [Part] | Type | Amount* [Part] | Type | Amount* [Part] | (exposure) atmosphere |
| Example 1 | Highly branched polymer 1 | 0.5 | PFPE-1 | 0.5 | None | — | Irg. 184 | 5 | None | — | Under nitrogen |
| Example 2 | Highly branched polymer 1 | 0.4 | PFPE-1 | 0.5 | PFPE-2 | 0.1 | Irg. 184 | 3 | None | — | Under air |
| Example 3 | Highly branched polymer 1 | 0.4 | PFPE-1 | 0.5 | PFPE-2 | 0.1 | Irg. 184 | 3 | Irg. 127 | 6 | Under air |
| Example 4 | Highly branched polymer 2 | 1.0 | Silicone-1 | 0.4 | None | — | Irg. 184 | 3 | Irg. 127 | 6 | Under nitrogen |
| Comparative Example 1 | None | — | None | — | None | — | Irg. 184 | 5 | None | — | Under nitrogen |
| Comparative Example 2 | Highly branched polymer 1 | 1.0 | None | — | None | — | Irg. 184 | 5 | None | — | Under nitrogen |
| Comparative Example 3 | Highly branched polymer 2 | 1.0 | None | — | None | — | Irg. 184 | 3 | Irg. 127 | 6 | Under nitrogen |
| Comparative Example 4 | None | — | Silicone-1 | 0.4 | None | — | Irg. 184 | 3 | Irg. 127 | 6 | Under nitrogen |
| Comparative Example 5 | F-552 | 0.5 | PFPE-1 | 0.5 | None | — | Irg. 184 | 5 | None | — | Under nitrogen |

*An added amount when the total amount of the urethane acrylate and a solid content of the silica sol is determined as 100 parts

TABLE 4

| | Oleic acid contact angle [degree] | | | | Felt pen ink wiping off property | HAZE value | |
|---|---|---|---|---|---|---|---|
| | Before wiping | After 3 times wiping | After 50 times wiping | After 100 times wiping | | Before rubbing | After rubbing |
| Example 1 | 75.1 | 69.9 | 71.0 | 69.8 | ○ | 0.24 | 0.21 |
| Example 2 | 73.6 | 65.6 | 53.4 | 50.7 | ○ | 0.24 | 2.19 |
| Example 3 | 75.8 | 73.2 | 71.9 | 70.8 | ○ | 0.43 | 2.21 |
| Example 4 | 65.4 | 60.4 | 50.5 | 49.8 | Δ | 0.49 | 0.80 |
| Comparative Example 1 | 12.8 | 12.3 | 12.0 | 12.1 | x | 0.20 | 0.58 |
| Comparative Example 2 | 73.5 | 51.0 | 38.7 | 37.3 | x | 0.31 | 0.36 |
| Comparative Example 3 | 65.1 | 50.0 | 42.0 | 40.3 | x | 0.15 | 0.58 |
| Comparative Example 4 | 41.5 | 35.6 | 29.9 | 28.0 | ○ | 0.27 | 0.27 |
| Comparative Example 5 | 42.3 | 26.3 | 23.6 | 23.0 | ○ | 0.73 | 1.05 |

[Example 5] Preparation and Evaluation of Acrylate Hard Coating Film 100 parts by mass of multifunctional acrylate [A-DPH, manufactured by Shin-Nakamura Chemical Co., Ltd.], 1 part by mass of the highly branched polymer 1 obtained in Synthesis Example 1 as a fluorine-containing highly branched polymer, 0.1 parts by mass of silicone-1 as a surface modifier, 1 part by mass of Irg. 907, and 100 parts by mass of MIBK were mixed and the mixture was dissolved with stirring to prepare a homogeneous curable composition.

The curable composition was applied on a glass substrate having a size of 5 cm×5 cm by spin coating (slope for 5 seconds, and subsequently, rotation at 500 rpm for 30 seconds, and further slope for 5 seconds) to obtain a coating film. After the solvent of the obtained coating film was removed by drying for 1 minute using a hot plate at 80° C., a hard coating film having a film thickness of about 5 μm to 10 μm was prepared by irradiating and exposing the coating film with UV light having an exposure amount of 960 mJ/cm$^2$.

The contact angles of oleic acid and water and the HAZE value of the obtained hard coating film were measured to evaluate an antifouling property and transparency, respectively. A line was written on the surface of the hard coating film with a felt pen [Magic ink (black) extra-fine, manufactured by Teranishi Chemical Industry Co., Ltd.], and after 30 seconds, the surface was wiped with a nonwoven fabric wiper [BEMCOT (trademark) M-1, manufactured by Asahi Kasei Fibers Corporation]. The wiping off property of the line written with the felt pen was visually evaluated. The result is listed in Table 5 together with the other results. The criteria of visual valuation of the felt pen ink wiping off property were the same as the previous description.

[Examples 6 to 11] Preparation and Evaluation of Acrylate Hard Coating Films

Similar operations to Example 5 were carried out for each Example except that the type and the amount of the fluorine-containing highly branched polymer and the type and the amount of the surface modifier listed in Table 5 were changed, and the obtained hard coating films were evaluated in a similar manner. The result is listed in Table 5 together with the other results.

[Comparative Examples 6 to 8] Preparation and Evaluation of Acrylate Hard Coating Films Similar operations to Example 5 were carried out for each Example except that the type and the amount of the fluorine-containing highly branched polymer and the type and the amount of the surface modifier listed in Table 5 were changed, and the obtained hard coating films were evaluated in a similar manner. The result is listed in Table 5 together with the other results.

TABLE 5

| | | Highly branched polymer | | Surface modifier | | Contact angle [degree] | | Felt pen ink wiping off property | HAZE value |
|---|---|---|---|---|---|---|---|---|---|
| | Polyfunctional monomer | Type | Amount* [Part] | Type | Amount* [Part] | $H_2O$ | Oleic acid | | |
| Example 5 | A-DPH | Highly branched polymer 1 | 1.0 | Silicone-1 | 0.1 | 103.3 | 59.2 | ○ | 0.31 |
| Example 6 | A-DPH | Highly branched polymer 1 | 1.0 | Silicone-1 | 0.3 | 100.0 | 52.0 | ○ | 0.34 |
| Example 7 | A-DPH | Highly branched polymer 1 | 1.0 | Silicone-1 | 0.5 | 98.6 | 50.5 | ○ | 0.44 |
| Example 8 | A-DPH | Highly branched polymer 1 | 1.0 | Silicone-1 | 0.7 | 95.6 | 50.3 | ○ | 0.56 |
| Example 9 | A-DPH | Highly branched polymer 1 | 1.0 | Silicone-1 | 1.0 | 99.6 | 50.4 | ○ | 0.82 |
| Example 10 | A-DPH | Highly branched polymer 2 | 1.0 | Silicone-1 | 0.1 | 107.1 | 61.4 | ○ | 0.78 |
| Example 11 | A-DPH | Highly branched polymer 2 | 1.0 | Silicone-1 | 0.3 | 105.7 | 54.9 | ○ | 0.46 |
| Comparative Example 6 | A-DPH | Highly branched polymer 1 | 1.0 | None | — | 106.1 | 70.9 | x | 0.24 |
| Comparative Example 7 | A-DPH | Highly branched polymer 2 | 1.0 | None | — | 107.8 | 62.0 | x | 0.91 |
| Comparative Example 8 | A-DPH | None | — | None | — | 62.0 | 15.7 | x | 0.46 |

*An added amount when the amount of the polyfunctional monomer is determined as 100 parts

[Example 12] Preparation and Evaluation of Urethane Acrylate Hard Coating Film 100 parts by mass of polyfunctional monomer UA-306H, 1 part by mass of the highly branched polymer 1 obtained in Synthesis Example 1 as a fluorine-containing highly branched polymer, 0.1 parts by mass of silicone-1 as a surface modifier, 1 part by mass of Irg. 907, and 100 parts by mass of MIBK were mixed and the mixture was dissolved with stirring to prepare a homogeneous curable composition.

The curable composition was applied on a glass substrate having a size of 5 cm×5 cm by spin coating (slope for 5 seconds, and subsequently, rotation at 500 rpm for 30 seconds, and further slope for 5 seconds) to obtain a coating film. After the solvent of the obtained coating film was removed by drying for 1 minute using a hot plate at 80° C., a hard coating film having a film thickness of about 5 μm to 10 μm was prepared by irradiating and exposing the coating film with UV light having an exposure amount of 960 mJ/cm$^2$.

The contact angles of oleic acid and water and the HAZE value of the obtained hard coating film were measured to evaluate an antifouling property and transparency, respectively. A line was written on the surface of the hard coating film with a felt pen [Magic ink (black) extra-fine, manufactured by Teranishi Chemical Industry Co., Ltd.], and after 30 seconds, the surface was wiped with a nonwoven fabric wiper [BEMCOT (trademark) M-1, manufactured by Asahi Kasei Fibers Corporation]. The wiping off property of the line written with the felt pen was visually evaluated. The result is listed in Table 6 together with the other results. The criteria of visual valuation of the felt pen ink wiping off property were the same as the previous description.

[Examples 13 to 19] Preparation and Evaluation of Urethane Acrylate Hard Coating Films Similar operations to Example 12 were carried out for each Example except that the type and the amount of the polyfunctional monomer and fluorine-containing highly branched polymer and the type and the amount of surface modifier listed in Table 6 were changed, and the obtained hard coating films were evaluated in a similar manner. The result is listed in Table 6 together with the other results.

[Comparative Examples 9 to 17] Preparation and Evaluation of Urethane acrylate hard coating films Similar operations to Example 12 were carried out for each Comparative Example except that the type and the amount of the polyfunctional monomer and fluorine-containing highly branched polymer and the type and the amount of the surface modifier listed in Table 6 were changed, and the obtained hard coating films were evaluated in a similar manner. The result is listed in Table 6 together with the other results.

TABLE 6

| | | Highly branched polymer | | Surface modifier | | Contact angle [degree] | | Felt pen ink wiping off property | HAZE value |
|---|---|---|---|---|---|---|---|---|---|
| | Polyfunctional monomer | Type | Amount* [Part] | Type | Amount* [Part] | H$_2$O | Oleic acid | | |
| Example 12 | UA-306H | Highly branched polymer 1 | 1.0 | Silicone-1 | 0.1 | 103.1 | 57.4 | ○ | 0.43 |
| Example 13 | UA-306H | Highly branched polymer 1 | 1.0 | Silicone-1 | 0.3 | 100.5 | 50.9 | ○ | 0.62 |
| Example 14 | UA-306H | Highly branched polymer 2 | 1.0 | Silicone-1 | 0.1 | 106.3 | 60.8 | ○ | 1.05 |
| Example 15 | UA-306H | Highly branched polymer 2 | 1.0 | Silicone-1 | 0.3 | 104.0 | 53.9 | ○ | 1.22 |
| Example 16 | UA-306I | Highly branched polymer 2 | 1.0 | Silicone-1 | 0.1 | 102.8 | 62.3 | ○ | 0.74 |
| Example 17 | UV7620 | Highly branched polymer 2 | 1.0 | Silicone-1 | 0.1 | 103.2 | 62.6 | ○ | 0.42 |
| Example 18 | UV7600 | Highly branched polymer 2 | 1.0 | Silicone-1 | 0.1 | 103.2 | 63.8 | ○ | 0.80 |
| Example 19 | BS575 | Highly branched polymer 2 | 1.0 | Silicone-1 | 0.1 | 103.7 | 64.7 | ○ | 0.75 |
| Comparative Example 9 | UA-306H | Highly branched polymer 1 | 1.0 | None | — | 102.7 | 65.0 | x | 0.44 |
| Comparative Example 10 | UA-306H | Highly branched polymer 2 | 1.0 | None | — | 107.4 | 62.7 | x | 0.75 |
| Comparative Example 11 | UA-306H | None | — | None | — | 63.3 | 13.2 | x | 0.26 |
| Comparative Example 12 | UA-306I | Highly branched polymer 2 | 1.0 | None | — | 103.7 | 64.0 | x | 0.46 |
| Comparative Example 13 | UA-306I | None | — | None | — | 64.5 | 11.7 | x | 0.22 |
| Comparative Example 14 | UV7620 | Highly branched polymer 2 | 1.0 | None | — | 103.5 | 63.7 | x | 0.26 |

TABLE 6-continued

|  | Highly branched polymer | | | Surface modifier | | Contact angle [degree] | | Felt pen ink wiping off property | HAZE value |
|---|---|---|---|---|---|---|---|---|---|
|  | Polyfunctional monomer | Type | Amount* [Part] | Type | Amount* [Part] | H₂O | Oleic acid | | |
| Comparative Example 15 | UV7620 | None | — | None | — | 70.4 | 11.2 | x | 0.20 |
| Comparative Example 16 | UV7600 | None | — | None | — | 67.5 | 12.7 | x | 0.33 |
| Comparative Example 17 | BS575 | None | — | None | — | 67.4 | 13.3 | x | 0.23 |

[Example 20] Evaluation of Artificial Fingerprint Attachment Property and Wiping Off Property To an artificial fingerprint plate on which an artificial fingerprint liquid was attached, a transfer silicon stamp of an artificial fingerprint kit [AFP-KIT-01, manufactured by TDK Corporation] was pressed for 1 second with a load of 1 kg. Thereafter, transfer of the artificial fingerprint was carried out onto the surface of the hard coating film prepared according to Example 19 for 1 second with a load of 1 kg to attach the artificial fingerprint. The artificial fingerprints were attached to three parts in total by a similar procedure, and a HAZE value was measured at each part. Each part where the artificial fingerprint was attached was wiped using a nonwoven fabric wiper [BEMCOT (trademark) M-1, manufactured by Asahi Kasei Fibers Corporation] with a load of 1 kg. HAZE values after the wiper was reciprocated 3 times and 10 times for wiping were measured. The result is listed in Table 7 together with the other results.

[Comparative Example 18] Preparation and Evaluation of General-Purpose Antifouling Hard Coating Film 100 parts by mass of fluorine-based general-purpose hard coating agent [DEFENSA FH-800ME, manufactured by DIC Corporation] and 100 parts by mass of MIBK were mixed to prepare a homogeneous curable composition.

The curable composition was applied on a glass substrate having a size of 5 cm×5 cm by spin coating (slope for 5 seconds, and subsequently, rotation at 500 rpm for 30 seconds, and further slope for 5 seconds) to obtain a coating film. After the solvent of the obtained coating film was removed by drying for 1 minute using a hot plate at 80° C., a hard coating film having a film thickness of about 5 μm to 10 μm was prepared by irradiating and exposing the coating film with UV light having an exposure amount of 960 mJ/cm².

The contact angles of oleic acid and water and the HAZE value of the obtained hard coating film were measured to evaluate an antifouling property and transparency, respectively. A line was written on the surface of the hard coating film with a felt pen [Magic ink (black) extra-fine, manufactured by Teranishi Chemical Industry Co., Ltd.], and after 30 seconds, the surface was wiped with a nonwoven fabric wiper [BEMCOT (trademark) M-1, manufactured by Asahi Kasei Fibers Corporation]. The wiping off property of the line written with the felt pen was visually evaluated. The criteria of visual valuation of the felt pen ink wiping off property were the same as the previous description.

The artificial fingerprint attachment property and the wiping off property of the artificial fingerprint were evaluated in a similar manner to Example 20. The result is listed in Table 7 together with the other results.

[Comparative Example 19] Preparation and Evaluation of General-Purpose Anti-Fingerprint Hard Coating Film A hard coating film was prepared and evaluated in a similar manner to Comparative Example 18 except that the DEFENSA FH-800ME/MIBK mixed solution was replaced by an undiluted solution of a general-purpose anti-fingerprint hard coating agent [LIODURAS EFC-211, manufactured by Toyo Ink MFG Co., Ltd.]. The result is listed in Table 7 together with the other results.

TABLE 7

|  | Contact angle [degree] | | Felt pen ink wiping off property | HAZE value (average of 3 measurement points) | | | |
|---|---|---|---|---|---|---|---|
|  | | | | Before artificial fingerprint attachment | After artificial fingerprint attachment | After 3 times reciprocating wiping | After 10 times reciprocating wiping |
|  | H₂O | Oleic acid | | | | | |
| Example 20 | 103.7* | 64.7* | ○* | 0.75* | 3.05 | 0.71 | 0.60 |
| Comparative Example 18 | 102.4 | 56.3 | ○ | 0.28 | 6.83 | 3.65 | 1.23 |
| Comparative Example 19 | 80.0 | 14.7 | x | 0.38 | 8.50 | 5.88 | 2.44 |

*The marked data are listed again

[Example 21] Surface Modification Using General-Purpose Non-Solvent Hard Coating Agent 1

0.3 parts by mass of the highly branched polymer 3 obtained in Example 3 as a fluorine-containing highly branched polymer and 0.7 parts by mass of PFPE-1 as a surface modifier were dissolved in 4 parts by mass of THF-A as a dilution monomer to prepare an additive liquid having a concentration of the effective components (the fluorine-containing highly branched polymer and the surface modifier) of 20% by mass.

5 parts by mass of the additive liquid was mixed with 100 parts by mass of a general-purpose non-solvent hard coating agent SK1110 in which the polyfunctional monomer and the polymerization initiator were formulated, and the mixture was stirred to form a homogeneous non-solvent curable composition.

The curable composition was applied on a polycarbonate substrate having a size of 5 cm×5 cm by spin coating (slope for 5 seconds, and subsequently, rotation at 2,000 rpm for 30 seconds, and further slope for 5 seconds) to obtain a coating film. The obtained coating film was irradiated and exposed with UV light having an exposure amount of 1,200 mJ/cm$^2$ under nitrogen atmosphere to prepare a hard coating film.

The contact angles of water and hexadecane of the obtained hard coating film were measured to evaluate an antifouling property. A line was written on the surface of the hard coating film with a felt pen [Magic ink (black) extra-fine, manufactured by Teranishi Chemical Industry Co., Ltd.], and after 30 seconds, the surface was wiped with a nonwoven fabric wiper [BEMCOT (trademark) M-1, manufactured by Asahi Kasei Fibers Corporation]. The wiping off property of the line written with the felt pen was visually evaluated. The result is listed in Table 8 together with the other results. The criteria of visual valuation of the felt pen ink wiping off property were the same as the previous description.

Examples 22 to 24

Similar operations to Example 21 were carried out for each Example except that the amount of the fluorine-containing highly branched polymer and the type and the amount of the surface modifier listed in Table 8 were changed, and the obtained hard coating films were evaluated in a similar manner. The result is listed in Table 8 together with the other results.

Comparative Example 20

Similar operations to Example 21 were carried out except that the used amount of the highly branched polymer 3 was changed to 1.0 part by mass and the surface modifier was not added, and the obtained hard coating film was evaluated in a similar manner. The result is listed in Table 8 together with the other results.

Comparative Example 21

Similar operations to Example 21 were carried out except that the additive liquid was replaced by 2.5 parts by mass of a general-purpose perfluoropolyether-based surface modifier RS75 (1.0 part by mass as an effective component because the concentration of the effective component in the modifier is 40% by mass), and the obtained hard coating film was evaluated in a similar manner. The result is listed in Table 8 together with the other results.

Comparative Example 22

Similar operations to Example 21 were carried out except that the additive liquid was replaced by 5.0 parts by mass of a general-purpose perfluoropolyether-based surface modifier DAC-HP (1.0 part by mass as an effective component because the concentration of the effective component in the modifier is 20% by mass), and the obtained hard coating film was evaluated in a similar manner. The result is listed in Table 8 together with the other results.

Comparative Example 23

Similar operations to Example 21 were carried out except that the additive liquid was not added at all, and the obtained hard coating film was evaluated in a similar manner. The result is listed in Table 8 together with the other results.

TABLE 8

|  | SK1110 [part by mass] | Additive liquid [part by mass] | | | | Contact angle [degree] | | Felt pen ink wiping off property |
|---|---|---|---|---|---|---|---|---|
|  |  | Highly branched polymer 3 | PFPE-1 | PFPE-3 | THF-A | H$_2$O | Hexadecane |  |
| Example 21 | 100 | 0.3 | 0.7 | — | 4 | 97.8 | 66.0 | Δ |
| Example 22 | 100 | 0.3 | 0.6 | 0.1 | 4 | 108.3 | 68.0 | ○ |
| Example 23 | 100 | 0.3 | 0.5 | 0.2 | 4 | 108.1 | 68.3 | ○ |
| Example 24 | 100 | 0.5 | 0.4 | 0.1 | 4 | 107.0 | 66.9 | Δ |
| Comparative Example 20 | 100 | 1.0 | — | — | 4 | 106.9 | 73.0 | x |
| Comparative Example 21 | 100 | 2.5 parts by mass of RS75 (1.0 part by mass as effective component) | | | | 99.6 | 48.6 | ○ |
| Comparative Example 22 | 100 | 5.0 parts by mass of DAC-HP (1.0 part by mass as effective component) | | | | 95.0 | 37.1 | ○ |
| Comparative Example 23 | 100 | None | | | | 95.0 | 36.0 | Δ |

As shown in Table 8, the hard coating films obtained from the curable compositions for coating of the present invention (Examples 21 to 24) provide the results that the hard coating films have both high contact angle of hexadecane and good felt pen ink wiping off property.

Conversely, the hard coating film in Comparative Example 20 that contains no surface modifier has high contact angle, but does not obtain good felt pen ink wiping off property. The hard coating films in Comparative Examples 21 and 22 that employ the general-purpose surface modifier have good felt pen ink wiping off property, but the contact angle of water and the contact angle of hexadecane are almost as the same as the hard coating film containing no additive liquid (Comparative Example 23). This means that water/oil repellent properties are not so enhanced.

[Example 25] Surface Modification Using General-Purpose Non-Solvent Hard Coating Agent 2

0.3 parts by mass of the highly branched polymer 3 obtained in Example 3 as a fluorine-containing highly branched polymer, 0.6 parts by mass of PFPE-1 and 0.1 parts by mass of PFPE-3 as a surface modifier were dissolved in 4 parts by mass of THF-A as a dilution monomer to prepare an additive liquid having a concentration of the effective components (the fluorine-containing highly branched polymer and the surface modifier) of 20% by mass.

5 parts by mass of the additive liquid was mixed with 100 parts by mass of a general-purpose non-solvent hard coating agent UR6530 in which the polyfunctional monomer and the polymerization initiator were formulated, and the mixture was stirred to form a homogeneous non-solvent curable composition.

The curable composition was applied onto a PET film having A4 size (210 mm×297 mm) using a wire bar coater (Bar Coater #9) to obtain a coating film. The obtained coating film was irradiated and exposed with UV light having an exposure amount of 1,200 mJ/cm$^2$ under nitrogen atmosphere to prepare a hard coating film.

The contact angles of oleic acid and water of the obtained hard coating film were measured, and an antifouling property was evaluated. A line was written on the surface of the hard coating film with a felt pen [Magic ink (black) extra-fine, manufactured by Teranishi Chemical Industry Co., Ltd.], and after 30 seconds, the surface was wiped with a nonwoven fabric wiper [BEMCOT (trademark) M-1, manufactured by Asahi Kasei Fibers Corporation]. The wiping off property of the line written with the felt pen was visually evaluated. The result is listed in Table 9 together with the other results. The criteria of visual valuation of the felt pen ink wiping off property were the same as the previous description.

Examples 26 and 27

Similar operations to Example 25 were carried out for each Example except that the amount of the surface modifier listed in Table 9 was changed and the obtained hard coating films were evaluated in a similar manner. The result is listed in Table 9 together with the other results.

Comparative Example 24

Similar operations to Example 25 were carried out except that the additive liquid was not added at all, and the obtained hard coating film was evaluated in a similar manner. The result is listed in Table 9 together with the other results.

TABLE 9

|  | UR6530 [part by mass] | Surface modifier [part by mass] | | | | Contact angle [degree] | | Felt pen ink wiping off property |
|---|---|---|---|---|---|---|---|---|
|  |  | Highly branched polymer 3 | PFPE-1 | PFPE-3 | THF-A | H$_2$O | Oleic acid |  |
| Example 25 | 100 | 0.3 | 0.6 | 0.1 | 4 | 115.0 | 75.0 | ○ |
| Example 26 | 100 | 0.3 | 0.5 | 0.2 | 4 | 109.8 | 73.1 | ○ |
| Example 27 | 100 | 0.2 | 0.5 | 0.3 | 4 | 115.6 | 72.8 | ○ |
| Comparative Example 24 | 100 | None | | | | 100.9 | 55.6 | x |

As shown in the results of Examples described above, in the hard coating film obtained from the curable composition for coating of the present invention, the results that the hard coating film has excellent antifouling properties of both anti-fingerprint property and felt pen ink wiping off property and has the liquid repellent property excellent in solvent wiping resistance under common film formation conditions such as UV irradiation in air atmosphere or nitrogen atmosphere were obtained.

The invention claimed is:

1. A curable composition for coating comprising:
   (a) a fluorine-containing highly branched polymer obtained by polymerization of a monomer A having two or more radical polymerizable double bonds in a molecule of the monomer A, a monomer B having a fluoroalkyl group and at least one radical polymerizable double bond in a molecule of the monomer B, and optionally another monomer, other than monomer A or monomer B, and which has at least one radical polymerizable double bond in a molecule, in the presence of a polymerization initiator C at an amount of 5% by mole to 200% by mole per the number of moles of the monomer A;
   (b) at least one surface modifier selected from the group consisting of a perfluoropolyether compound and a silicone compound;
   (c) an active energy ray-curable polyfunctional monomer; and
   (d) a polymerization initiator that generates radicals by irradiation with an active energy ray, wherein 0.001% by mass to 10% by mass of (a) the fluorine-containing highly branched polymer is present per mass of (c) the polyfunctional monomer.

2. The curable composition for coating according to claim 1, wherein
the monomer A is a compound having any one of or both of a vinyl group or a (meth)acrylic group.

3. The curable composition for coating according to claim 2, wherein
the monomer A is a divinyl compound or a di(meth)acrylate compound.

4. The curable composition for coating according to claim 3, wherein
the monomer A is ethylene glycol di(meth)acrylate.

5. The curable composition for coating according to claim 1, wherein
(a) the fluorine-containing highly branched polymer is a highly branched polymer obtained by using 5% by mole to 300% by mole of the monomer B per the monomer A.

6. The curable composition for coating according to claim 5, wherein
the monomer B is a compound having any one of or both of a vinyl group or a (meth)acrylic group.

7. The curable composition for coating according to claim 6, wherein
the monomer B is a compound of Formula [1]

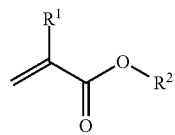

[1]

where $R^1$ is a hydrogen atom or a methyl group; and $R^2$ is a fluoroalkyl group having a carbon atom number of 2 to 12 and optionally substituted with a hydroxy group.

8. The curable composition for coating according to claim 7, wherein
the monomer B is a compound of Formula [2]

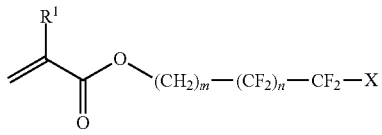

[2]

where $R^1$ has the same definition as in Formula [1]; X is a hydrogen atom or a fluorine atom; m is 1 or 2; and n is an integer of 0 to 5.

9. The curable composition for coating according to claim 1, wherein
the polymerization initiator C is an azo-based polymerization initiator.

10. The curable composition for coating according to claim 9, wherein
the polymerization initiator C is dimethyl 2,2'-azobisisobutyrate.

11. The curable composition for coating according to claim 1, wherein
the curable composition includes 0.001% by mass to 20% by mass of (b) the surface modifier per mass of (c) the polyfunctional monomer.

12. The curable composition for coating according to claim 11, wherein
(b) the surface modifier is a compound having a (meth)acryloyl group.

13. The curable composition for coating according to claim 11, wherein
(b) the surface modifier is a perfluoropolyether compound.

14. The curable composition for coating according to claim 1, wherein
(c) the polyfunctional monomer is at least one selected from the group consisting of a polyfunctional (meth)acrylate compound and a polyfunctional urethane (meth)acrylate compound.

15. The curable composition for coating according to claim 1, wherein
the curable composition includes 1% by mass to 20% by mass of (d) the polymerization initiator per mass of (c) the polyfunctional monomer.

16. The curable composition for coating according to claim 15, wherein
(d) the polymerization initiator is an alkylphenone compound.

17. The curable composition for coating according to claim 1, further comprising
(e) silica fine particles.

18. The curable composition for coating according to claim 17, wherein
the curable composition includes 5% by mass to 80% by mass of (e) the silica fine particles per mass of (c) the polyfunctional monomer.

19. The curable composition for coating according to claim 18, wherein
(e) the silica fine particles have an average particle diameter of 1 nm to 100 nm.

20. The curable composition for coating according to claim 1, further comprising
a solvent.

21. A hard coating film comprising a hard coating layer on at least one surface of a film substrate, the hard coating layer being formed by forming a coating film by applying the curable composition for coating as claimed in claim 20 on the film substrate; drying the coating film to remove the solvent; and irradiating the coating film with ultraviolet rays to cure the coating film.

22. The hard coating film according to claim 21, wherein
the hard coating layer has a film thickness of 1 μm to 30 μm.

23. A cured film made from the curable composition for coating as claimed in claim 1.

24. The curable composition for coating according claim 1, wherein
the fluorine-containing highly branched polymer is obtained by polymerization of the monomer A, the monomer B, and said another monomer.

25. The curable composition for coating according claim 1, wherein
(a) the fluorine-containing highly branched polymer is present in an amount of 0.001% by mass to 1% by mass per mass of (c) the polyfunctional monomer.

* * * * *